(12) United States Patent
Liu et al.

(10) Patent No.: US 12,253,624 B2
(45) Date of Patent: Mar. 18, 2025

(54) SIGNAL TRANSMISSION METHOD AND APPARATUS, SIGNAL PROCESSING METHOD AND APPARATUS, AND RADAR SYSTEM

(71) Applicant: Shenzhen Yinwang Intelligent Technologies Co., Ltd., Shenzhen (CN)

(72) Inventors: Jinnan Liu, Shenzhen (CN); Mu Zhou, Shanghai (CN); Dapeng Lao, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 343 days.

(21) Appl. No.: 17/675,258

(22) Filed: Feb. 18, 2022

(65) Prior Publication Data
US 2022/0171021 A1 Jun. 2, 2022

Related U.S. Application Data

(63) Continuation of application No. PCT/CN2019/101409, filed on Aug. 19, 2019.

(51) Int. Cl.
*G01S 7/35* (2006.01)
*G01S 13/34* (2006.01)
*G01S 13/58* (2006.01)

(52) U.S. Cl.
CPC ............ *G01S 7/354* (2013.01); *G01S 13/343* (2013.01); *G01S 13/583* (2013.01)

(58) Field of Classification Search
CPC .... G01S 13/931; G01S 13/343; G01S 13/345; G01S 13/583; G01S 13/92; G01S 13/092;
(Continued)

(56) References Cited

U.S. PATENT DOCUMENTS 5,623,930 A * 4/1997 Wright ................ A61B 8/06
600/456
5,882,306 A * 3/1999 Ramamurthy ........ G01S 7/5206
600/440
(Continued)

FOREIGN PATENT DOCUMENTS

CN 102461052 A 5/2012
CN 102783038 A 11/2012
(Continued)

OTHER PUBLICATIONS

I. Shapir et al., "Doppler Ambiguity Resolving in TDMA Automotive MIMO Radar via Digital Multiple PRF," Apr. 23, 2018, 6 pages.
(Continued)

*Primary Examiner* — Vladimir Magloire
*Assistant Examiner* — Michael W Justice
(74) *Attorney, Agent, or Firm* — Conley Rose, P.C.

(57) ABSTRACT

A signal transmission method applied to a multiple-input multiple-output (MIMO) radar, the MIMO radar includes a transmitter, and the transmitter includes a plurality of transmit antennas. The signal transmission method includes sending, by the transmitter, a first burst in a first measurement frame, where the first measurement frame is used to measure a velocity of a target, and when the first burst is sent, each of the plurality of transmit antennas sends a chirp signal in a time division manner, and sending, by the transmitter, a second burst in the first measurement frame after the transmitter sends the first burst in the first measurement frame, where when the second burst is sent, a quantity of transmit antennas configured to send a chirp signal is one.

18 Claims, 13 Drawing Sheets

(58) Field of Classification Search

CPC ........ G01S 13/536; G01S 7/534; G01S 7/415; G01S 2013/0254; G01S 2013/0245

USPC .................................................. 342/200, 119

See application file for complete search history.

(56) References Cited

U.S. PATENT DOCUMENTS

| | | | | |
|---|---|---|---|---|
| 6,154,659 | A * | 11/2000 | Jalali | H04W 52/24 455/69 |
| 7,525,479 | B2 * | 4/2009 | Nagai | G01S 13/48 342/158 |
| 8,081,698 | B2 * | 12/2011 | Xu | H04L 27/2601 370/467 |
| 8,565,201 | B2 * | 10/2013 | Jeong | H04L 5/0023 370/312 |
| 8,630,268 | B2 * | 1/2014 | Tamaki | H04B 7/0691 375/267 |
| 8,670,410 | B2 * | 3/2014 | Luo | H04L 1/1607 370/331 |
| 9,036,738 | B2 * | 5/2015 | Miyazaki | H04L 1/0055 375/261 |
| 9,629,098 | B2 * | 4/2017 | Wallén | H04W 52/367 |
| 9,689,967 | B1 * | 6/2017 | Stark | G01S 7/0233 |
| 9,759,810 | B1 | 9/2017 | Sankar | |
| 9,877,287 | B2 * | 1/2018 | Wallen | H04W 52/367 |
| 9,945,943 | B2 * | 4/2018 | Stark | G01S 7/0233 |
| 10,180,494 | B2 * | 1/2019 | Kuehnle | H01Q 1/32 |
| 10,261,179 | B2 * | 4/2019 | Davis | G01S 13/87 |
| 10,379,204 | B2 * | 8/2019 | Loesch | G01S 13/931 |
| 10,436,890 | B2 * | 10/2019 | Loesch | G01S 13/34 |
| 10,539,672 | B2 * | 1/2020 | Bilik | G01S 13/343 |
| 10,627,483 | B2 * | 4/2020 | Rao | G01S 7/354 |
| 11,255,958 | B2 * | 2/2022 | Wang | G01S 13/42 |
| 11,262,448 | B2 * | 3/2022 | Davis | G01S 13/87 |
| 11,353,578 | B2 * | 6/2022 | Wang | G01S 13/42 |
| 11,378,649 | B2 * | 7/2022 | Rao | G01S 13/42 |
| 11,614,538 | B2 * | 3/2023 | Davis | G01S 7/023 342/16 |
| 11,693,107 | B2 * | 7/2023 | Rajendran | G01S 13/42 342/112 |
| 11,821,981 | B2 * | 11/2023 | Davis | G01S 7/023 |
| 11,835,645 | B2 * | 12/2023 | Lin | H01Q 21/061 |
| 11,885,870 | B2 * | 1/2024 | Harnett | G01S 7/2883 |
| 2006/0067263 | A1 * | 3/2006 | Li | H04B 7/0802 370/315 |
| 2008/0095263 | A1 * | 4/2008 | Xu | H04L 1/0021 375/295 |
| 2008/0291088 | A1 * | 11/2008 | Nagai | G01S 13/48 342/374 |
| 2011/0141982 | A1 | 6/2011 | Zhang et al. | |
| 2011/0142159 | A1 * | 6/2011 | Jeong | H04L 5/0023 375/295 |
| 2012/0134279 | A1 * | 5/2012 | Tamaki | H04B 7/0452 370/248 |
| 2012/0236771 | A1 * | 9/2012 | Luo | H04L 1/1861 370/329 |
| 2012/0320994 | A1 | 12/2012 | Loghin et al. | |
| 2014/0073352 | A1 * | 3/2014 | Aldana | G01S 5/10 455/456.1 |
| 2014/0105322 | A1 * | 4/2014 | Ouchi | H04L 1/0643 375/295 |
| 2014/0148186 | A1 * | 5/2014 | Zhou | H04W 72/0446 455/561 |
| 2014/0301505 | A1 * | 10/2014 | Miyazaki | H04L 25/067 375/320 |
| 2015/0204972 | A1 * | 7/2015 | Kuehnle | G01S 13/42 342/156 |
| 2016/0073353 | A1 * | 3/2016 | Wallén | H04W 52/243 455/522 |
| 2016/0131752 | A1 * | 5/2016 | Jansen | G01S 13/42 342/27 |
| 2016/0173254 | A1 | 6/2016 | Fay | |
| 2017/0045609 | A1 * | 2/2017 | Loesch | H01Q 1/3233 |
| 2017/0115384 | A1 * | 4/2017 | Loesch | G01S 13/42 |
| 2017/0131392 | A1 * | 5/2017 | Schoor | G01S 13/42 |
| 2017/0195971 | A1 * | 7/2017 | Wallén | H04W 52/288 |
| 2017/0219689 | A1 | 8/2017 | Hung et al. | |
| 2017/0276770 | A1 * | 9/2017 | Lin | H01Q 3/24 |
| 2017/0293027 | A1 * | 10/2017 | Stark | G01S 13/87 |
| 2017/0322295 | A1 * | 11/2017 | Loesch | G01S 13/931 |
| 2018/0011170 | A1 * | 1/2018 | Rao | G01S 7/354 |
| 2018/0109284 | A1 | 4/2018 | Hadani et al. | |
| 2018/0164422 | A1 * | 6/2018 | Bilik | G01S 7/4021 |
| 2018/0252809 | A1 * | 9/2018 | Davis | G01S 7/0233 |
| 2018/0352464 | A1 | 12/2018 | Zhou | |
| 2019/0110256 | A1 * | 4/2019 | Immonen | H04L 1/0025 |
| 2019/0113602 | A1 | 4/2019 | Matsumoto | |
| 2019/0253184 | A1 | 8/2019 | Xing | |
| 2019/0265346 | A1 | 8/2019 | Hakobyan et al. | |
| 2019/0271776 | A1 * | 9/2019 | Davis | G01S 13/87 |
| 2019/0346535 | A1 | 11/2019 | Thompson | |
| 2020/0209352 | A1 * | 7/2020 | Rao | G01S 13/42 |
| 2020/0278435 | A1 * | 9/2020 | Wang | G01S 13/931 |
| 2020/0278440 | A1 * | 9/2020 | Wang | G01S 13/584 |
| 2020/0406911 | A1 | 12/2020 | She et al. | |
| 2021/0025972 | A1 * | 1/2021 | Loesch | G01S 7/028 |
| 2021/0286067 | A1 * | 9/2021 | Harnett | G01S 7/414 |
| 2022/0099819 | A1 * | 3/2022 | Rajendran | G01S 13/42 |
| 2022/0334240 | A1 * | 10/2022 | Wu | G01S 7/288 |
| 2022/0342036 | A1 * | 10/2022 | Rao | G01S 13/92 |
| 2022/0350020 | A1 * | 11/2022 | Davis | G01S 13/32 |
| 2023/0243964 | A1 * | 8/2023 | Davis | G01S 7/023 342/16 |

FOREIGN PATENT DOCUMENTS

| | | |
|---|---|---|
| CN | 103843272 A | 6/2014 |
| CN | 105722234 A | 6/2016 |
| CN | 107005521 A | 8/2017 |
| CN | 107925434 A | 4/2018 |
| CN | 107925446 A | 4/2018 |
| CN | 107979402 A | 5/2018 |
| CN | 108885255 A | 11/2018 |
| CN | 109923435 A | 6/2019 |
| EP | 3425419 A1 | 1/2019 |
| JP | 2004085452 A | 3/2004 |
| JP | 2019074404 A | 5/2019 |
| WO | 2016183240 A1 | 11/2016 |

OTHER PUBLICATIONS

Fabian Roos et al,. "Enhancement of Doppler Unambiguity for Chirp-Sequence Modulated TDM-MIMO Radars," IEEE MTT-S International Conference on Microwaves for Intelligent Mobility (ICMIM), Apr. 15, 2018, 4 pages.

* cited by examiner

SIGNAL TRANSMISSION METHOD AND APPARATUS, SIGNAL PROCESSING METHOD AND APPARATUS, AND RADAR SYSTEM

CROSS-REFERENCE TO RELATED APPLICATIONS

This is a continuation of International Patent Application No. PCT/CN2019/101409 filed on Aug. 19, 2019, which is hereby incorporated by reference in its entirety.

TECHNICAL FIELD

This application relates to the field of sensor technologies, and in particular, to a signal transmission method and apparatus, a signal processing method and apparatus, and a radar system.

BACKGROUND

An in-vehicle radar is an indispensable sensor in an automated driving system. A vehicle may be provided with obstacle (which may also be referred to as a target) detection by using the in-vehicle radar. A distance, a velocity, and an azimuth angle of an obstacle around the vehicle may be detected.

In recent years, an in-vehicle radar technology has evolved continuously. For example, a frequency band gradually evolves from 24 gigahertz (GHz) to 77 GHz/79 GHz, to obtain a higher range resolution by using a larger sweep bandwidth. A quantity of channels evolves from a single-input multiple-output (SIMO) mode to a multiple-input multiple-output (MIMO) mode to expand a virtual antenna aperture and improve an angular resolution.

In a MIMO radar, a plurality of antennas may send chirp signals in a time-division multiplexing (TDM) manner. Although the MIMO radar can improve the angular resolution, the MIMO radar has a problem of decreasing a maximum velocity measurement range. Generally, a maximum velocity measurement range of a radar may be expressed as $Vmax=\lambda/4*Tc$, where $\lambda$ is a wavelength for frequency modulation, and Tc is a transmission repetition period of a same antenna. It is assumed that a duration of sending one chirp signal by a single antenna is Tc_SIMO (which may be referred to as a timeslot). Then, in a TDM MIMO radar, when Nt antennas send Nt chirp signals in the TDM manner, a required time Tc_MIMO meets $Tc\_MIMO \geq Nt*Tc\_SIMO$. Therefore, a relationship between a maximum velocity measurement range Vmax_MIMO when the Nt antennas are configured to send chirp and a maximum velocity measurement range Vmax_SIMO when the single antenna is configured to send chirp (that is, a velocity measurement range of a SIMO radar) may be expressed as $Vmax\_SIMO \geq Nt*Vmax\_MIMO$. It can be learned from the foregoing formula that, in the MIMO radar, due to a larger quantity of transmit antennas, the maximum velocity measurement range is decreased relative to that of the SIMO radar. Moreover, a larger quantity Nt of transmit antennas indicates a more serious problem of decreasing the maximum velocity measurement range. When the maximum velocity measurement range is decreased, velocity aliasing is more likely to occur when a velocity of a target is calculated. In addition, due to measurement coupling between a velocity and an angle in the TDM MIMO radar, the velocity aliasing affects angle solution, resulting in failure to achieve the desired objective of improving the angular resolution.

In conclusion, a signal transmission and processing solution for the MIMO radar is urgently needed, so that the MIMO radar can accurately resume a velocity of a target to the velocity measurement range of the SIMO radar.

SUMMARY

Embodiments of this application provide a signal transmission method and apparatus, a signal processing method and apparatus, and a radar system, so that a MIMO radar can accurately resume a velocity of a target to a velocity measurement range of a SIMO radar.

According to a first aspect, an embodiment of this application provides a signal transmission method. The method is applied to a MIMO radar, the MIMO radar includes a transmitter, and the transmitter includes a plurality of transmit antennas. The signal transmission method includes sending, by the transmitter, a first burst in a first measurement frame. The first measurement frame is used to measure a velocity of a target, and when the first burst is sent, each of the plurality of transmit antennas sends a chirp signal in a time division manner. The transmitter sends a second burst in the first measurement frame after the transmitter sends the first burst in the first measurement frame. When the second burst is sent, a quantity of transmit antennas configured to send a chirp signal is one.

According to the foregoing solution, target velocity range search may be performed by using an echo signal formed after the first burst sent in a MIMO manner is reflected and an echo signal formed after the second burst sent in a SIMO manner after the first burst is reflected, to obtain a velocity aliasing coefficient of one or more targets by matching, and resume a velocity measurement range of the MIMO radar to a velocity measurement range of a SIMO radar. In addition, complexity of MIMO spectrum peak search can be reduced, and impact of channel phase noise on overlapping can be reduced. In addition, because a strength of an echo signal is inversely proportional to a fourth power of a distance, when a SIMO burst (that is, the second burst) is sent after a MIMO burst (that is, the first burst), a fast moving target can move to a closer distance in the SIMO, so that a problem of a weak echo signal of the fast moving target in the SIMO burst is alleviated to some extent.

In addition, before the transmitter sends the first burst in the first measurement frame, the method further includes sending, by the transmitter, a third burst in the first measurement frame before sending the first burst in the first measurement frame. When the third burst is sent, a quantity of transmit antennas configured to send a chirp signal is one, and a transmit antennas configured to send the third burst and a transmit antennas configured to send the second burst are a same transmit antenna. The transmitter sends the first measurement frame at a duty cycle of P %, P<100, and the duty cycle is equal to a ratio of a first duration to a second duration. The first duration is a duration of the first measurement frame, and the second duration is a time difference between two adjacent measurement frames sent by the transmitter. According to the foregoing solution, three bursts are sent in one measurement frame, where the first burst sent at a middle position is sent in a MIMO manner, and a prefix and a suffix of the first burst are sent in a SIMO manner. Then, when echo signals formed after the measurement frame is reflected by one or more targets are processed, the two bursts sent in the SIMO manner may be selected for velocity matching, so that target velocity calculation is simpler. In addition, a problem that a scattering center of a fast moving target moves over a transmission time can be alleviated to some extent. In addition, the transmitter sends the first measurement frame at the duty cycle of P %, so that in each measurement period, after a measurement frame is sent, there is an idle time and a processing time before a next measurement frame is sent. To this end, the duty cycle P % exists.

In addition, after the transmitter sends the first measurement frame, the method further includes sending, by the transmitter a fourth burst in a second measurement frame. The second measurement frame is used to measure the velocity of the target, and when the fourth burst is sent, each of the plurality of transmit antennas sends a chirp signal in the time division manner. The transmitter sends a fifth burst in the second measurement frame after the transmitter sends the fourth burst in the second measurement frame. When the fifth burst is sent, a quantity of transmit antennas configured to send a chirp signal is one, and transmission parameters of the fifth burst, the second burst, and the third burst are the same. The transmission parameter includes a transmission slope, a transmit antenna, a quantity of transmitted chirp signals, a duration of each chirp signal, and the like. According to the foregoing solution, when the velocity of the target is calculated, the second burst in the first measurement frame may be considered as a SIMO prefix in the second measurement frame, to reduce transmission overheads.

In a possible design, in the first burst, quantities of chirp signals sent by the plurality of transmit antennas are different from each other. According to the foregoing solution, if the quantities of chirp signals sent by the transmit antennas in the first burst are different from each other, the complexity of the spectrum peak search can be further reduced by using a high-density transmit antenna.

In a possible design, the first measurement frame is any one of a frequency modulated continuous wave (FMCW), a multiple frequency-shift keying (MFSK), or a phase modulated continuous wave (PMCW).

In addition, the MIMO radar may further include a processing unit, and the method further includes determining, by the processing unit, a configuration of the first measurement frame, and sending the configuration of the first measurement frame to a monolithic microwave integrated circuit (MMIC) by using an interface. The MMIC is configured to enable, based on the configuration of the first measurement frame, the transmitter to send the first measurement frame. According to the foregoing solution, a related parameter may be configured for the MMIC, to complete sending of the first measurement frame.

According to a second aspect, an embodiment of this application further provides a signal processing method. The method is applied to a MIMO radar, the MIMO radar includes a transmitter, a receiver, and a processing unit, and the transmitter includes a plurality of transmit antennas. The signal processing method includes receiving, by the receiver, a first echo signal and a second echo signal. The first echo signal is formed after a first burst in a measurement frame sent by the transmitter is reflected by one or more targets, the second echo signal is formed after a second burst in the measurement frame is reflected by the one or more targets, and the second burst is sent after the first burst. When the first burst is sent, each of the plurality of transmit antennas sends a chirp signal in a time division manner. When the second burst is sent, a quantity of transmit antennas configured to send a chirp signal is one. The processing unit determines a velocity of the one or more targets based on echo signals received by the receiver.

According to the signal processing method provided in the second aspect, target velocity range search may be performed by using an echo signal formed after the first burst sent in a MIMO manner is reflected and an echo signal formed after the second burst sent in a SIMO manner after the first burst is reflected, to obtain a velocity aliasing coefficient of one or more targets by matching, and resume a velocity measurement range of the MIMO radar to a velocity measurement range of a SIMO radar.

In a possible design, the processing unit determines a velocity of the one or more targets based on echo signals received by the receiver includes the processing unit determines a first identifier based on the first echo signal. The first identifier is used to indicate a distance measurement value and a velocity measurement value of the one or more targets. The processing unit determines a second identifier based on the second echo signal. The second identifier is used to indicate a distance measurement value and a velocity measurement value of the one or more targets. The processing unit determines the velocity of the one or more targets based on the first identifier and the second identifier. According to the foregoing solution, a velocity aliasing coefficient of the target may be determined based on two groups of identifiers (that is, the first identifier and the second identifier) of the target, to determine the velocity of the target.

In a possible design, the processing unit determines the velocity of the one or more targets based on the first identifier and the second identifier includes the processing unit determines, based on a transmission repetition period of a first transmit antenna in the first burst, an aliasing coefficient interval corresponding to the first identifier. The processing unit determines an aliasing coefficient subset based on the first identifier, the second identifier, and the aliasing coefficient interval. The processing unit determines a velocity aliasing coefficient based on the aliasing coefficient subset. The processing unit determines the velocity of the one or more targets based on the velocity aliasing coefficient and the first identifier.

In addition, the method further includes receiving, by the receiver receives a third echo signal. The third echo signal is formed after a third burst in the measurement frame is reflected by the one or more targets, and the third burst is sent before the first burst. That the processing unit determines a velocity of the one or more targets based on echo signals received by the receiver includes: If the one or more targets move away from the radar system, the processing unit determines the velocity of the one or more targets based on the first echo signal and the third echo signal. If the one or more targets move close to the radar system, the processing unit determines the velocity of the one or more targets based on the first echo signal and the second echo signal. According to the foregoing solution, because a target actually moves in the three bursts, for a distant target, such movement affects strength of a received signal from the target. When the target gets away, a distance between the target and the second burst is longer, the strength of the signal from the target is reduced, and then data in the third burst is more reliable. When the target gets close, the distance to the target in the second burst is shorter, the strength of the signal from the target is increased, and then data in the second burst is more reliable.

In a possible design, that the processing unit determines a velocity aliasing coefficient based on the aliasing coefficient subset includes the processing unit determines an observation result of a virtual MIMO subarray based on the echo signals received by the receiver. The processing unit determines the velocity aliasing coefficient based on the observation result of the virtual MIMO subarray. The virtual MIMO subarray is a uniform planar subarray or a uniform linear subarray including virtual array elements in a virtual array, each transmit antenna corresponds to a same quantity of virtual array elements in the virtual MIMO subarray, and the virtual array includes a plurality of transmit antennas and a plurality of receive antennas included in the receiver. According to the foregoing solution, an angular spectrum can be calculated by selecting a plurality of array elements in the virtual array to form a virtual MIMO subarray, and performing FFT on an observation result of the virtual MIMO subarray.

In a possible design, that the processing unit determines a velocity aliasing coefficient based on the aliasing coefficient subset includes: The processing unit determines an observation result of a virtual MIMO subarray based on the echo signals received by the receiver. The processing unit determines the velocity aliasing coefficient based on the observation result of the virtual MIMO subarray. The virtual MIMO subarray is a uniform planar subarray or a uniform linear subarray including virtual array elements in a virtual array, the uniform planar subarray and the uniform linear subarray are obtained by linear interpolation, each transmit antenna corresponds to a same quantity of virtual array elements in the virtual MIMO subarray, and the virtual array includes a plurality of transmit antennas and a plurality of receive antennas included in the receiver. According to the foregoing solution, if a virtual MIMO subarray meeting the condition (that is, all array elements in the MIMO subarray are equally spaced, and each transmit antenna corresponds to a same quantity of virtual array elements in the virtual MIMO subarray) cannot be found in the virtual array, the virtual MIMO subarray may be formed by linear interpolation.

According to a third aspect, an embodiment of this application provides a signal transmission apparatus, including a transmitter, including a plurality of transmit antennas, and configured to send a first burst in a first measurement frame, where the first measurement frame is used to measure a velocity of a target, and when the first burst is sent, each of the plurality of transmit antennas sends a chirp signal in a time division manner; and send a second burst in the first measurement frame after sending the first burst in the first measurement frame, where when the second burst is sent, a quantity of transmit antennas configured to send a chirp signal is one.

In a possible design, the transmitter is further configured to send a third burst in the first measurement frame before sending the first burst in the first measurement frame. When the third burst is sent, a quantity of transmit antennas configured to send a chirp signal is one, and a transmit antennas configured to send the third burst and a transmit antennas configured to send the second burst are a same transmit antenna. The transmitter sends the first measurement frame at a duty cycle of P %, P<100, the duty cycle is equal to a ratio of a first duration to a second duration, the first duration is a duration of the first measurement frame, and the second duration is a time difference between two adjacent measurement frames sent by the transmitter.

In a possible design, the transmitter is further configured to send a fourth burst in a second measurement frame after sending the first measurement frame, where the second measurement frame is used to measure the velocity of the target, and when the fourth burst is sent, each of the plurality of transmit antennas sends a chirp signal in the time division manner; and send a fifth burst in the second measurement frame after sending the fourth burst in the second measurement frame, where when the fifth burst is sent, a quantity of transmit antennas configured to send a chirp signal is one, and transmission parameters of the fifth burst, the second burst, and the third burst are the same.

The transmission parameter includes one or more of the following: a transmission slope, a transmit antenna, a quantity of sent chirp signals, or a duration of each chirp signal.

In a possible design, the first measurement frame is any one of a FMCW, a MFSK, or a PMCW.

In a possible design, the apparatus further includes a processing unit configured to determine a configuration of the first measurement frame, and send the configuration of the first measurement frame to a MMIC using an interface. The MMIC is configured to enable, based on the configuration of the first measurement frame, the transmitter to send the first measurement frame.

According to a fourth aspect, an embodiment of this application provides a signal processing apparatus including a receiver configured to receive a first echo signal and a second echo signal, where the first echo signal is formed after a first burst in a measurement frame sent by a transmitter is reflected by one or more targets, the second echo signal is formed after a second burst in the measurement frame is reflected by the one or more targets, and the second burst is sent after the first burst; when the first burst is sent, each of a plurality of transmit antennas sends a chirp signal in a time division manner; and when the second burst is sent, a quantity of transmit antennas configured to send a chirp signal is one, and a processing unit configured to determine a velocity of the one or more targets based on echo signals received by the receiver.

In a possible design, when determining the velocity of the one or more targets based on echo signals received by the receiver, the processing unit is further configured to determine a first identifier based on the first echo signal, where the first identifier is used to indicate a distance measurement value and a velocity measurement value of the one or more targets, determine a second identifier based on the second echo signal, where the second identifier is used to indicate a distance measurement value and a velocity measurement value of the one or more targets; and determine the velocity of the one or more targets based on the first identifier and the second identifier.

In a possible design, when determining the velocity of the one or more targets based on the first identifier and the second identifier, the processing unit is further configured to determine, based on a transmission repetition period of a first transmit antenna in the first burst, an aliasing coefficient interval corresponding to the first identifier, determine an aliasing coefficient subset based on the first identifier, the second identifier, and the aliasing coefficient interval, determine a velocity aliasing coefficient based on the aliasing coefficient subset, and determine the velocity of the one or more targets based on the velocity aliasing coefficient and the first identifier.

In a possible design, the receiver is further configured to receive a third echo signal. The third echo signal is formed after a third burst in the measurement frame is reflected by the one or more targets, and the third burst is sent before the first burst. When determining the velocity of the one or more targets based on echo signals received by the receiver, the processing unit is further configured to if the one or more targets move away from the radar system, determine the velocity of the one or more targets based on the first echo signal and the third echo signal; and if the one or more targets move close to the radar system, determine the velocity of the one or more targets based on the first echo signal and the second echo signal.

In a possible design, when determining the velocity aliasing coefficient based on the aliasing coefficient subset, the processing unit is further configured to determine an observation result of a virtual MIMO subarray based on the echo signals received by the receiver, and determine the velocity aliasing coefficient based on the observation result of the virtual MIMO subarray. The virtual MIMO subarray is a uniform planar subarray or a uniform linear subarray including virtual array elements in a virtual array, each transmit antenna corresponds to a same quantity of virtual array elements in the virtual MIMO subarray, and the virtual array includes a plurality of transmit antennas and a plurality of receive antennas included in the receiver.

In a possible design, when determining the velocity aliasing coefficient based on the aliasing coefficient subset, the processing unit is further configured to determine an observation result of a virtual MIMO subarray based on the echo signals received by the receiver, and determine the velocity aliasing coefficient based on the observation result of the virtual MIMO subarray. The virtual MIMO subarray is a uniform planar subarray or a uniform linear subarray including virtual array elements in a virtual array, the uniform planar subarray and the uniform linear subarray are obtained by linear interpolation, each transmit antenna corresponds to a same quantity of virtual array elements in the virtual MIMO subarray, and the virtual array includes a plurality of transmit antennas and a plurality of receive antennas included in the receiver.

According to a fifth aspect, an embodiment of this application provides a radar system, including a transmitter, including a plurality of transmit antennas, and configured to send a first burst in a measurement frame, where the measurement frame is used to measure a velocity of a target, and when the first burst is sent, each of the plurality of transmit antennas sends a chirp signal in a time division manner, and send a second burst in the measurement frame after sending the first burst in the measurement frame, where when the second burst is sent, a quantity of transmit antennas configured to send a chirp signal is one; a receiver, configured to receive a first echo signal and a second echo signal, where the first echo signal is formed after the first burst is reflected by one or more targets, and the second echo signal is formed after the second burst is reflected by the one or more targets, and a processing unit, configured to determine a velocity of the one or more targets based on echo signals received by the receiver.

DESCRIPTION OF EMBODIMENTS

Generally, a maximum velocity measurement range of a radar may be expressed as $Vmax=\lambda/4*Tc$, where $\lambda$ is a wavelength for frequency modulation, and Tc is a transmission repetition period of a same antenna. It is assumed that a duration of sending one chirp signal by a single antenna is Tc_SIMO (which may be referred to as a timeslot). Then, in a TDM MIMO radar, when Nt antennas send Nt chirp signals in a TDM manner, a required time Tc_MIMO meets $Tc\_MIMO \geq Nt*Tc\_SIMO$. Therefore, a relationship between a maximum velocity measurement range Vmax_MIMO when the Nt antennas are configured to send chirp and a maximum velocity measurement range Vmax_SIMO when the single antenna is configured to send chirp may be expressed as $Vmax\_SIMO \geq Nt*Vmax\_MIMO$. It can be learned from the foregoing formula that, in the MIMO radar, due to a larger quantity of transmit antennas, the maximum velocity measurement range is decreased. Moreover, a larger quantity Nt of transmit antennas indicates a more serious problem of decreasing the maximum velocity measurement range.

The radar is an apparatus that measures a velocity by using a doppler effect. Due to motion of a target or the radar, a received signal of the radar has a frequency change or a phase change. In an FMCW system, a distance between the target and the radar is measured by measuring a frequency of an echo signal within a chirp signal, and a velocity of the target is measured by a phase difference between echo signals of a same antenna in different timeslots. Therefore, a dimension corresponding to the velocity is also referred to as a doppler domain, that is, a dimension corresponding to the doppler on an RD map.

Radar signals sent on a plurality of antennas in a time division manner cause a higher probability of collision between velocities of targets in the doppler domain, that is, observed values of reflected signals of a plurality of targets in the doppler domain are the same, which affects complexity and accuracy of velocity solution of each target. For example, when a SIMO manner is used for sending, a maximum velocity measurement range is −120 km/h to 120 km/h. When four antennas are used for sending in a TDM MIMO manner, a maximum velocity measurement range is reduced to −30 km/h to 30 km/h. In this case, compared with sending in the SIMO manner, sending in the TDM MIMO manner has a higher probability of collision between velocities of targets in the doppler domain.

Based on the foregoing problem, embodiments of this application provide a signal transmission method and apparatus, a signal processing method and apparatus, and a radar system, so that a MIMO radar can accurately resume a velocity of a target to a velocity measurement range of a SIMO radar.

The following describes an application scenario of an embodiment of this application.

Figure 1:
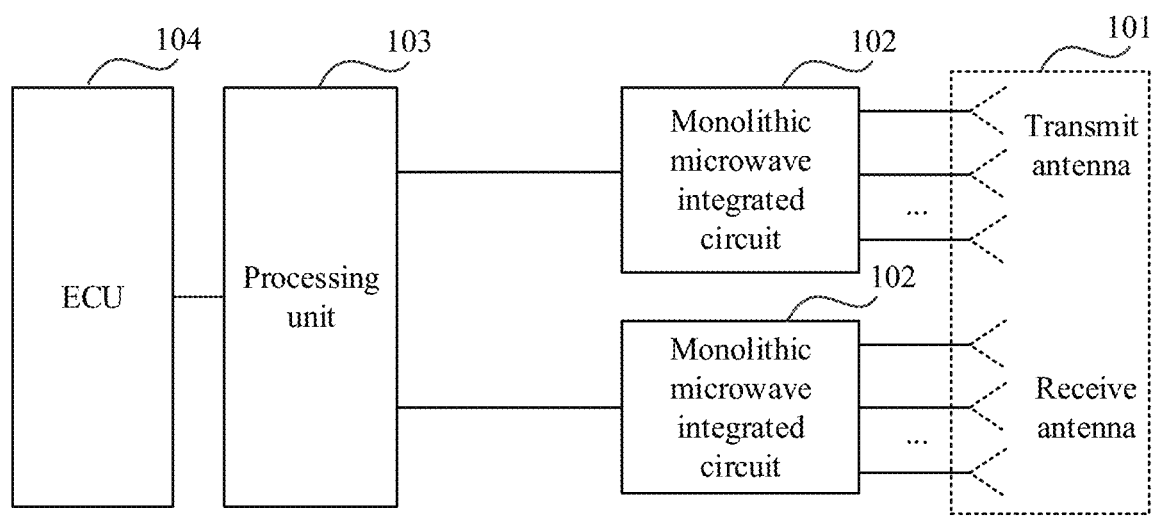
FIG. 1 is a schematic diagram of a structure of a MIMO radar according to an embodiment of this application.

In this embodiment of this application, as shown in FIG. 1, a MIMO radar system may include an antenna array 101, a MMIC 102, and a processing unit 103. The antenna array 101 may include a plurality of transmit antennas and a plurality of receive antennas.

The monolithic microwave integrated circuit 102 is configured to generate a radar signal, and then send the radar signal by using the antenna array 101. The radar signal includes one or more bursts, and each burst includes a plurality of chirp signals. After the radar signal is sent, an echo signal is formed after the radar signal is reflected by one or more targets, and the echo signal is received by a receive antenna. The monolithic microwave integrated circuit 102 is further configured to perform processing such as conversion and sampling on the echo signal received by the antenna array 101, and transmit a processed echo signal to the processing unit 103.

The processing unit 103 is configured to perform operations such as fast Fourier transform (FFT) and signal processing on the echo signal, to determine information such as a distance, a velocity, and an azimuth angle of the target based on the received echo signal. The processing unit 103 may be a microprocessor (e.g. microcontroller unit (MCU)), a central processing unit (CPU), a digital signal processor (DSP), or a field-programmable gate array (FPGA), or other components with a processing function.

In addition, the radar system shown in FIG. 1 may further include an electronic control unit (ECU) 104 configured to control a vehicle, for example, determine a vehicle route, based on the distance, the velocity, the azimuth angle, and other information of the target that are obtained by the processing unit 103 after processing.

It should be noted that, in an actual application, one MMIC may be disposed for each of a transmit antenna array and a receive antenna array, or only one MMIC may be disposed for the transmit antenna array and the receive antenna array. The former is shown for illustration in an example of FIG. 1.

In this embodiment of this application, a transmitter may include a transmit antenna and a transmit channel in the monolithic microwave integrated circuit 102, and a receiver may include a receive antenna and a receive channel in the monolithic microwave integrated circuit 102. The transmit antenna and the receive antenna may be located on a printed circuit board (PCB), and the transmit channel and the receive channel may be located in a chip, that is, AOBs (antennas on PCB). Alternatively, the transmit antenna and the receive antenna may be located in a chip package, and the transmit channel and the receive channel may be located in a chip, that is, AIPs (antennas in package). A combination form is not limited in this embodiment of this application.

It should be understood that specific structures of the transmit channel and the receive channel are not limited in this embodiment of this application, provided that corresponding transmit and receive functions can be implemented.

In addition, it should also be noted that the radar system in this embodiment of this application may be applied to a variety of fields. For example, the radar system in this embodiment of this application includes, but is not limited to, an in-vehicle radar, a roadside traffic radar, and a radar for an unmanned aerial vehicle.

In addition, because a quantity of channels of a single radio frequency chip is limited, when quantities of transmit and receive channels required by the system are greater than those of the single radio frequency chip, a plurality of chips need to be cascaded. Therefore, the entire radar system may include a plurality of cascaded radio frequency chips, which are connected to an analog-to-digital converter (ADC) channel by using interfaces to output data to the processing unit 103 such as an MCU, a DSP, an FPGA, or a general processing unit (GPU). In addition, one or more radar systems may be installed on the entire vehicle, and connected to a central processing unit by using an in-vehicle bus. The central processing unit controls one or more in-vehicle sensors, including one or more millimeter wave radar sensors.

Figure 2:
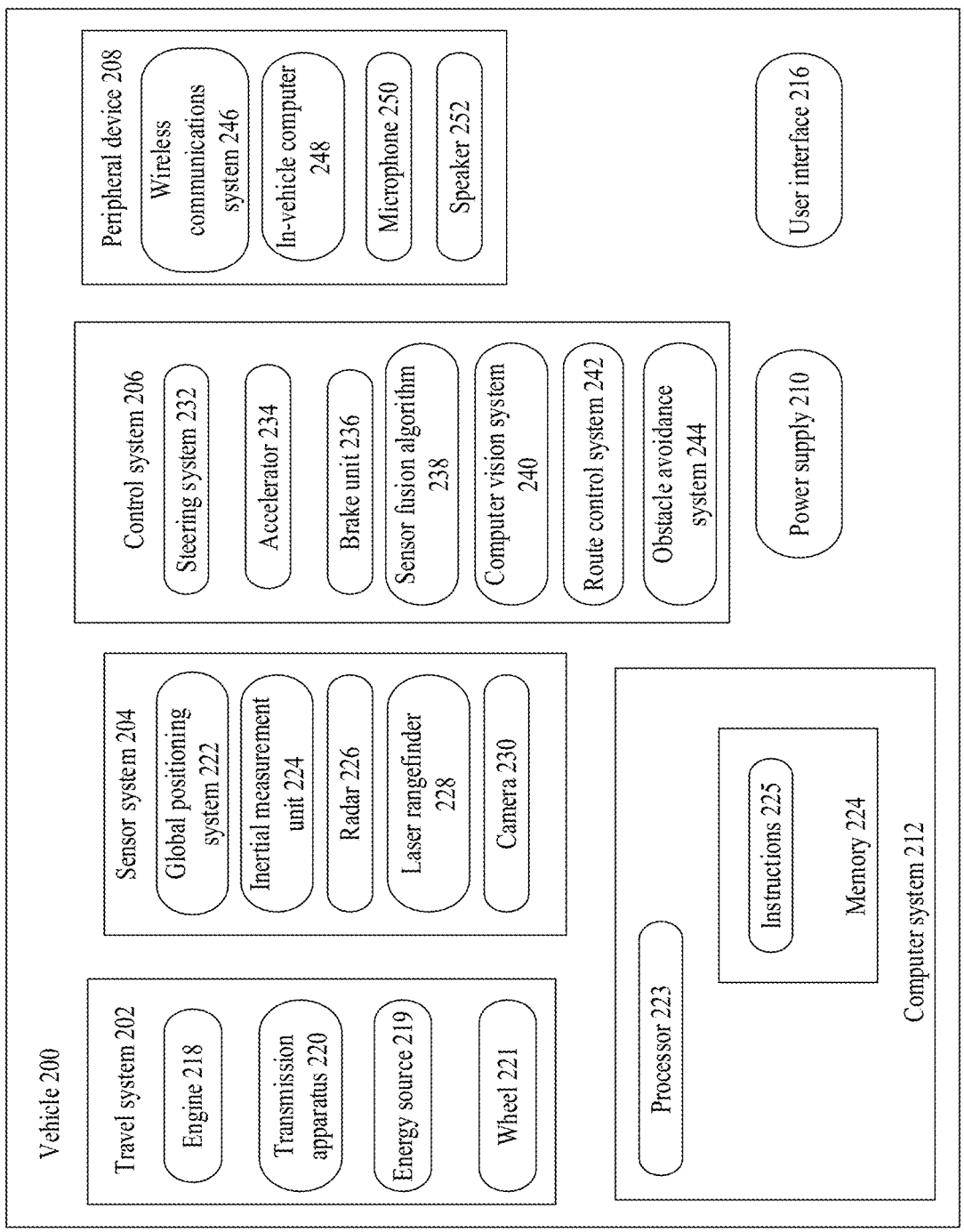
FIG. 2 is a schematic diagram of a structure of a vehicle according to an embodiment of this application.

The MIMO radar system shown in FIG. 1 may be applied to a vehicle with a self-driving function. FIG. 2 is a functional block diagram of a vehicle 200 with a self-driving function according to an embodiment of this application. In an embodiment, the vehicle 200 is configured to be in a fully or partially self-driving mode. For example, when the vehicle 200 is in the self-driving mode, the vehicle 200 may control the vehicle 200, and may determine current statuses of the vehicle and an ambient environment of the vehicle based on manual operations, determine possible behavior of at least one another vehicle in the ambient environment, determine a confidence level corresponding to a possibility that the another vehicle performs the possible behavior, and control the vehicle 200 based on the determined information. When the vehicle 200 is in the self-driving mode, the vehicle 200 may be configured to operate without interacting with a person.

The vehicle 200 may include various subsystems, such as a travel system 202, a sensor system 204, a control system 206, one or more peripheral devices 208, a power supply 210, a computer system 212, and a user interface 216. Optionally, the vehicle 200 may include fewer or more subsystems, and each subsystem may include a plurality of elements. In addition, all the subsystems and elements of the vehicle 200 may be interconnected to each other through a wired manner or a wireless manner.

The travel system 202 may include a component that provides power motion for the vehicle 200. In an embodiment, the travel system 202 may include an engine 218, an energy source 219, a transmission apparatus 220, and a wheel/tire 221. The engine 218 may be a combination of an internal combustion engine, an electric motor, an air compression engine, or another type of engine, for example, a hybrid engine including a gasoline engine and an electric motor, or a hybrid engine including an internal combustion engine and an air compression engine. The engine 218 converts the energy source 219 into mechanical energy.

Examples of the energy source 219 include gasoline, diesel, other oil-based fuel, propane, other compressed gasbased fuel, ethanol, solar panels, batteries, and other power sources. The energy source 219 may also provide energy for another system of the vehicle 100.

The transmission apparatus 220 may transfer mechanical power from the engine 218 to the wheel 221. The transmission apparatus 220 may include a gearbox, a differential, and a drive shaft. In an embodiment, the transmission apparatus 220 may further include another component, for example, a clutch. The drive shaft may include one or more shafts that may be coupled to one or more wheels 221.

The sensor system 204 may include several sensors for sensing information about a surrounding environment of the vehicle 200. For example, the sensor system 204 may include a positioning system 222 (the positioning system may be a Global Positioning System (GPS) system, or may be a BeiDou system or another positioning system), an inertial measurement unit (IMU) 224, a radar 226, a laser rangefinder 228, and a camera 230. The sensor system 204 may further include sensors (for example, an in-vehicle air quality monitor, a fuel gauge, and an oil temperature gauge) in an internal system of the monitored vehicle 200. Sensor data from one or more of these sensors can be used to detect an object and corresponding features (a location, a shape, a direction, a velocity, and the like) of the object. Such detection and identification are key functions of a safety operation of the automated vehicle 100.

The positioning system 222 may be configured to estimate a geographic position of the vehicle 200. The IMU 224 is configured to sense changes in position and orientation of the vehicle 200 based on inertial acceleration. In an embodiment, the IMU 224 may be a combination of an accelerometer and a gyroscope.

The radar 226 may sense an object within the surrounding environment of the vehicle 200 by using a radio signal. In some embodiments, in addition to sensing the object, the radar 226 may be further configured to sense a velocity and/or a moving direction of the object. In a specific example, the radar 226 may be implemented by using the MIMO radar system shown in FIG. 1.

The laser rangefinder 228 may sense, by using a laser, an object in an environment in which the vehicle 100 is located. In some embodiments, the laser rangefinder 228 may include one or more laser sources, a laser scanner, one or more detectors, and another system component.

The camera 230 may be configured to capture a plurality of images of the surrounding environment of the vehicle 200. The camera 230 may be a static camera or a video camera.

The control system 206 controls operations of the vehicle 200 and components of the vehicle. The control system 206 may include various elements, including a steering system 232, an accelerator 234, a brake unit 236, a sensor fusion algorithm 238, a computer vision system 240, a route control system 242, and an obstacle avoidance system 244.

The steering system 232 may be operated to adjust a heading direction of the vehicle 200, For example, in an embodiment, the steering system may be a steering wheel system.

The accelerator 234 is configured to control an operating velocity of the engine 218 to control a velocity of the vehicle 200.

The brake unit 236 is configured to control the vehicle 200 to decelerate. The brake unit 236 may slow the wheel 221 by using friction. In other embodiments, the brake unit 236 may convert kinetic energy of the wheel 221 into an electric current. The brake unit 236 may alternatively slow a rotational velocity of the wheel 221 by another form to control the velocity of the vehicle 200.

The computer vision system 240 may be operated to process and analyze an image captured by the camera 230, to recognize an object and/or a feature in the surrounding environment of the vehicle 200. The object and/or feature may include a traffic signal, a road boundary, and an obstacle. The computer vision system 240 may use an object recognition algorithm, a structure from motion (SFM) algorithm, video tracking, and other computer vision technologies. In some embodiments, the computer vision system 240 may be configured to map an environment, track an object, estimate a velocity of an object, and the like.

The route control system 242 is configured to determine a driving route of the vehicle 200. In some embodiments, the route control system 142 may determine a driving route for the vehicle 200 with reference to data from the sensors 238, the GPS 222, and one or more predetermined maps.

The obstacle avoidance system 244 is configured to recognize, evaluate, and avoid or otherwise bypass a potential obstacle in the environment of the vehicle 200.

Certainly, in an embodiment, the control system 206 may add or alternatively include components other than those shown and described, or may reduce some of the components shown above.

The vehicle 200 interacts with an external sensor, another vehicle, another computer system, or a user through the peripheral device 208. The peripheral device 208 may include a wireless communications system 246, an in-vehicle computer 248, a microphone 250, and/or a speaker 252.

In some embodiments, the peripheral device 208 provides means for the user of the vehicle 200 to interact with the user interface 216. For example, the in-vehicle computer 248 may provide information to the user of the vehicle 200. The user interface 216 may further receive user input through the in-vehicle computer 248. The in-vehicle computer 248 may be operated by using a touchscreen. In other cases, the peripheral device 208 may provide means for the vehicle 200 to communicate with other devices located in the vehicle. For example, the microphone 250 may receive audio (for example, a voice command or other audio input) from the user of the vehicle 200. Similarly, the speaker 252 may output audio to the user of the vehicle 200.

The wireless communications system 246 may perform wireless communication with one or more devices directly or through a communications network. For example, the wireless communications system 246 may use third generation (3G) cellular communications such as code-division multiple access (CDMA), Evolution-Data Optimized (EVDO), a global system for mobile communications (GSM)/general packet radio service (GPRS), or fourth generation (4G) cellular communications such as Long-Term Evolution (LTE), or fifth generation (5G) cellular communications. The wireless communications system 246 may communicate with a wireless local area network (WLAN) through Wi-Fi. In some embodiments, the wireless communications system 246 may directly communicate with a device through an infrared link, BLUETOOTH, or ZigBee. Other wireless protocols, for example, various vehicle communications systems, such as the wireless communications system 246, may include one or more dedicated short range communications (DSRC) devices, which may include public and/or private data communications between vehicles and/or roadside stations.

The power supply 210 may provide power to various components of the vehicle 200. In an embodiment, the power supply 210 may be a rechargeable lithium-ion or lead-acid battery. One or more battery packs of such batteries may be configured as the power supply to supply power to the components of the vehicle 200. In some embodiments, the power supply 210 and the energy source 219 may be implemented together, for example, as implemented in some all-electric vehicles.

Some or all functions of the vehicle 200 are controlled by the computer system 212. The computer system 212 may include at least one processor 223. The processor 223 executes instructions 225 stored in a non-transient computer-readable medium such as a memory 224. The computer system 212 may alternatively be a plurality of computing devices that control individual components or subsystems of the vehicle 200 in a distributed manner.

The processor 223 may be any conventional processor, such as a commercially available central processing unit (CPU). Alternatively, the processor may be a dedicated device such as an application-specific integrated circuit (ASIC) or other hardware-based processors. FIG. 2 shows a function diagram including a processor, a memory, and other components of the computer 210 in the same block. A person of ordinary skill in the art should understand that the processor, the computer, or the memory may actually include a plurality of processors, computers, or memories that may or may not be stored in the same physical housing. For example, the memory may be a hard disk drive, or another storage medium located in a housing different from a housing of the computer 210. Thus, it is understood that a reference to the processor or the computer includes a reference to a set of processors or computers or memories that may or may not operate in parallel. Different from using a single processor to perform the steps described herein, some components such as a steering component and a deceleration component may include respective processors. The processor performs only computation related to a component-specific function.

In various aspects described herein, the processor may be located far away from the vehicle and perform wireless communication with the vehicle. In other aspects, some of the processes described herein are performed on the processor disposed inside the vehicle, while others are performed by a remote processor. The processes include necessary steps for performing a single operation.

In some embodiments, the memory 224 may include the instructions 225 (for example, program logic), and the instructions 225 may be executed by the processor 223 to perform various functions of the vehicle 200, including functions described above. The memory 224 may further include additional instructions, including instructions for sending data to, receiving data from, interacting with, and/or controlling one or more of the travel system 202, the sensor system 204, the control system 206, and the peripheral device 208.

In addition to the instructions 225, the memory 224 may further store data, such as a road map, route information, a vehicle location, a vehicle direction, a vehicle velocity, and other vehicle data, and other information. Such information may be used by the vehicle 200 and the computer system 212 during operation of the vehicle 200 in an autonomous, semi-autonomous, and/or manual mode.

The user interface 216 is configured to provide information to or receive information from the user of the vehicle 200. Optionally, the user interface 216 may include one or more input/output devices within a set of peripheral devices 208, such as the wireless communications system 246, the in-vehicle computer 248, the microphone 250, and the speaker 252.

The computer system 212 may control a function of the vehicle 200 based on input received from various subsystems (for example, the travel system 202, the sensor system 204, and the control system 206) and the user interface 216. For example, the computer system 212 may control the steering unit 232 by using input from the control system 206, to avoid an obstacle detected by the sensor system 204 and the obstacle avoidance system 244. In some embodiments, the computer system 212 may be operated to provide control over many aspects of the vehicle 200 and subsystems of the vehicle.

Optionally, one or more of the foregoing components may be installed separately from or associated with the vehicle 200. For example, the memory 224 may be partially or fully separated from the vehicle 200. The foregoing components may be communicatively coupled together in a wired and/or wireless manner.

Optionally, the foregoing components are merely examples. In actual application, components in the foregoing modules may be added or deleted according to actual requirements. FIG. 2 should not be understood as any limitation on the embodiments of this application.

An autonomous vehicle traveling on a road, such as the vehicle 200, may identify objects in an ambient environment of the vehicle 200 to determine to adjust a current velocity. The objects may be the other vehicles, traffic control devices, or objects of other types. In some examples, the autonomous vehicle may independently consider each identified object, and may determine a to-be-adjusted velocity of the autonomous vehicle based on features of each identified object, such as a current velocity of the object, acceleration of the object, and a distance between the object and the vehicle.

Optionally, the self-driving vehicle 200 or a computing device (such as the computer system 212, the computer vision system 240, and the memory 224 in FIG. 2) associated with the self-driving vehicle 200 may predict behavior of the recognized object based on the feature of the recognized object and a status (for example, traffic, rain, or road ice) of the surrounding environment. Optionally, all the identified objects depend on behavior of each other, and therefore all the identified objects may be considered together to predict behavior of a single identified object. The vehicle 200 can adjust the velocity of the vehicle 200 based on the predicted behavior of the identified object. In other words, the self-driving vehicle can determine, based on the predicted behavior of the object, a stable status to which the vehicle needs to be adjusted (for example, acceleration, deceleration, or stop). In this process, another factor may also be considered to determine the velocity of the vehicle 200, for example, a horizontal location of the vehicle 200 on a road on which the vehicle travels, a curvature of the road, and proximity between a static object and a dynamic object.

In addition to providing an instruction for adjusting the velocity of the self-driving vehicle, the computing device may further provide an instruction for modifying a steering angle of the vehicle 200, so that the self-driving vehicle follows a given trajectory and/or maintains safe lateral and longitudinal distances between the self-driving vehicle and an object near the self-driving vehicle (for example, a car in an adjacent lane on the road).

The vehicle 200 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specially limited in this embodiment of this application.

The following further describes in detail the embodiments of this application with reference to the accompanying drawings.

It should be noted that, in the embodiments of this application, "a plurality of" means two or more. In addition, it should be understood that, in the descriptions of this application, terms such as "first" and "second" are merely used for distinguishing and description, but cannot be understood as indicating or implying relative importance, or indicating or implying an order. "Coupling" in this application refers to an electrical connection, and may include two manners: a direct connection or an indirect connection. The following briefly describes application scenarios of the embodiments of this application.

Figure 3:
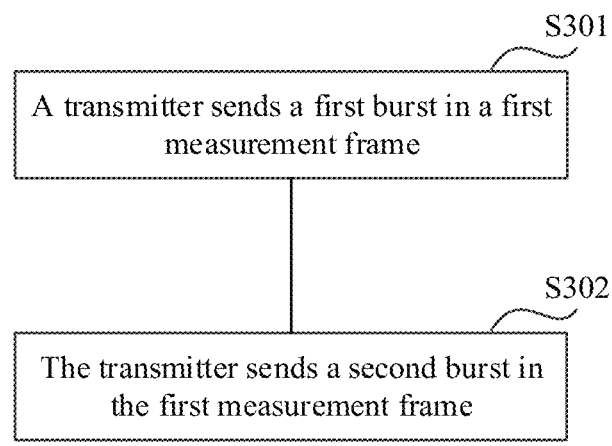
FIG. 3 is a schematic diagram of a flowchart of a signal transmission method according to an embodiment of this application.

FIG. 3 shows a signal transmission method according to an embodiment of this application. The method is applied to a MIMO radar. The MIMO radar includes a transmitter, and the transmitter includes a plurality of transmit antennas. The method shown in FIG. 3 includes the following steps.

Step S301: The transmitter sends a first burst in a first measurement frame.

The first measurement frame is used to measure a velocity of a target, and when the first burst is sent, each of the plurality of transmit antennas sends a chirp signal in a time division manner.

Step S302: The transmitter sends a second burst in the first measurement frame after the transmitter sends the first burst in the first measurement frame.

When the second burst is sent, a quantity of transmit antennas configured to send a chirp signal is one. In an actual signal, a duration of a single chirp signal includes a sweep time (that is, an effective measurement time) and an idle time (for example, a phase-locked loop stabilization time or an analog-to-digital converter stabilization time).

The first measurement frame may be an FMCW. Certainly, the first measurement frame may alternatively use a waveform used by another MIMO radar, for example, may be either of an MFSK and an PMCW. This is not limited in this application.

It should be understood that a first transmit antenna in this embodiment of this application may not necessarily be a transmit antenna whose physical sequence number is one, and the first transmit antenna may be any one of plurality of transmit antennas.

In this embodiment of this application, in the first burst, each transmit antenna sends a chirp signal in the time division manner, that is, each transmit antenna sends a chirp signal. In the second burst, only one transmit antenna transmits a chirp signal, which is referred to as a first transmit antenna in this embodiment of this application. The first burst may be considered as being sent in a MIMO manner, and the second burst may be considered as being sent in a SIMO manner.

Figure 4:
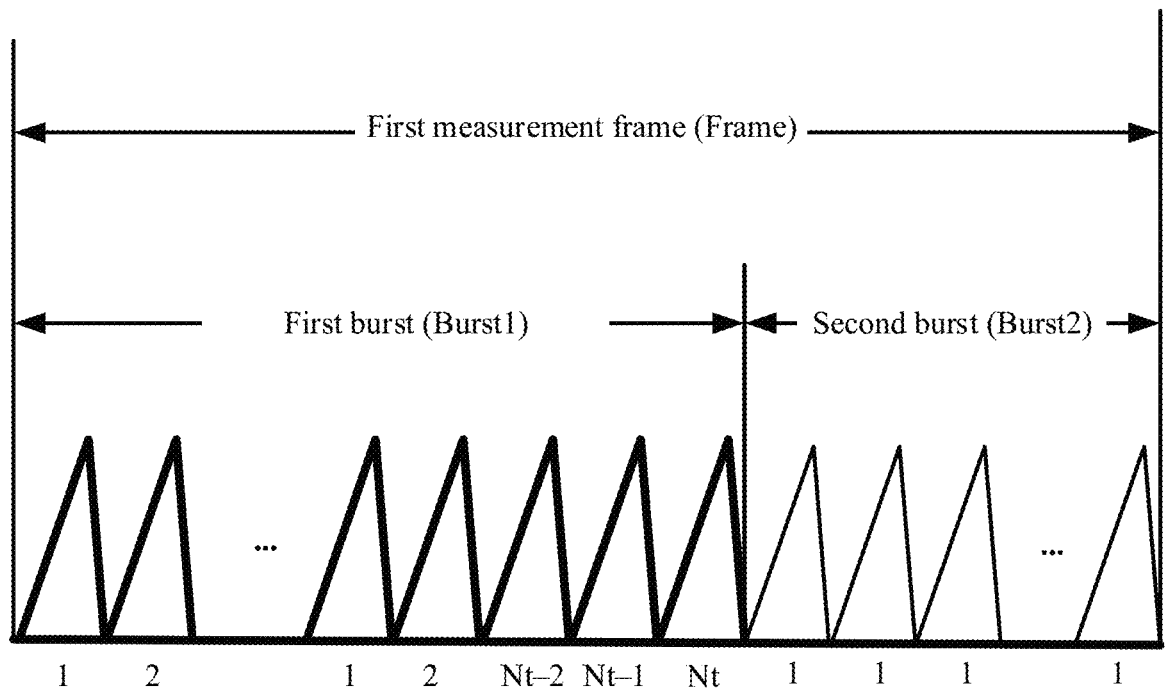
FIG. 4 is a schematic diagram of a chirp signal sent by a first MIMO radar according to an embodiment of this application.

For example, it is assumed that the transmitter includes Nt transmit antennas respectively identified by 1, 2, 3, . . . , Nt-2, Nt-1, and Nt. Then, a specific example of the first measurement frame that includes the first burst (Burst1) and the second burst (Burst2) and that is sent by the Nt transmit antennas may be shown in FIG. 4. In the example of FIG. 4, a triangle represents a chirp signal, and each chirp signal occupies a timeslot. In FIG. 4, for each chirp signal, a transmit antenna that transmits the chirp signal is represented by a number under the chirp signal. The first burst includes a plurality of chirp signals, which are sent by the Nt transmit antennas in the time division manner. The second burst also includes a plurality of chirp signals, which are sent only by the first transmit antenna.

It should be understood that, examples of this application are all similar to the example of FIG. 4, where a strip is used to represent a chirp signal, and a shape of the strip is merely an example, but does not represent a waveform of a chirp signal in an actual application. A specific waveform of the chirp signal is not limited in this embodiment of this application.

It should be noted that an order in which the Nt transmit antennas send the chirp signals in the first burst is not limited in this embodiment of this application. For example, for the Nt transmit antennas 1, 2, 3, . . . Nt-2, Nt-1, and Nt, a transmission order may be 1, 2, 3, . . . Nt-2, Nt-1, and Nt, or the transmission order may not be arranged based on the numbers, such as 5, 8, 7, 10 . . . Nt, Nt-2, Nt-1. That is, in the first burst, the chirp signals may be sequentially sent based on an arrangement order of the transmit antennas, or may be sent in another order. The sequential sending herein means that a transmission order of the antennas is consistent with spatial adjacency in physical arrangement of the antennas, and the sending in another order means that a transmission order of the antennas is inconsistent with spatial adjacency in physical arrangement of the antennas.

Because the first measurement frame includes the second burst transmitted in the SIMO manner, it may be understood that in this embodiment of this application, transmission overheads are introduced to resolve a problem of coupling between a velocity and an angle in a TDM MIMO radar.

Due to complexity of an in-vehicle environment, accuracy requirements on the target in a spatial dimension (a distance, a horizontal azimuth angle, and a vertical azimuth angle) and a velocity dimension may not be the same. Therefore, waveform parameters (for example, a quantity of chirp signals included in the first burst, a transmission period of a transmit antenna, a time segment occupied by each transmit antenna, and a duration of each chirp signal) in the first burst and waveform parameters (a quantity of chirp signals sent by the first transmit antenna, a duration of each chirp signal, and the like) in the second burst may be dynamically configured based on the in-vehicle environment. Generally, an ECU configures the waveform parameters of the first burst and the second burst on a radar module by using a common in-vehicle bus, for example, controller area network (CAN), controller area network with flexible data-rate (CAN-FD), general Ethernet (GE), or other in-vehicle interfaces. The radar module may configure the parameters on a MMIC by using a serial peripheral interface (SPI). When a plurality of chips are cascaded, master and slave radio frequency front-end chips may be configured for flexible configuration. The MMIC may be configured to enable the transmitter based on the foregoing configuration to send the first measurement frame.

It should be noted that, when the in-vehicle interface configures the parameters on the radar module, the configured parameters are not limited to the foregoing examples, provided that the configured parameters are used to indicate how the transmit antennas send chirp signals. For example, the configured parameters may be specific values of quantities of chirp signals included in the first burst and the second burst, a transmission period of a transmit antenna, a time segment occupied by each transmit antenna, and a duration of each chirp signal, or may be equivalent parameters of the specific values of the quantity of chirp signals included in the first burst, the transmission period of the transmit antenna, the time segment occupied by each transmit antenna, and the duration of each chirp signal.

It should also be noted that, in this embodiment of this application, the burst is a concept of a time segment, and the burst may also be referred to as another name such as a timeslot, a subframe, or a frame. In addition, in the description of this application, a timeslot is a minimum time unit, one burst includes at least one timeslot, one subframe includes at least one burst, and one frame includes at least one subframe.

According to the foregoing solution, target velocity range search may be performed by using an echo signal formed after the first burst sent in a MIMO manner is reflected and an echo signal formed after the second burst sent in a SIMO manner after the first burst is reflected, to obtain a velocity aliasing coefficient of one or more targets by matching, and resume a velocity measurement range of the MIMO radar to a velocity measurement range of a SIMO radar. In addition, complexity of MIMO spectrum peak search can be reduced, and impact of channel phase noise on overlapping can be reduced. In addition, because a strength of an echo signal is inversely proportional to a fourth power of a distance, when a SIMO burst (that is, the second burst) is sent after a MIMO burst (that is, the first burst), a fast moving target can move to a closer distance in the SIMO, so that a problem of a weak echo signal of the fast moving target in the SIMO burst is alleviated to some extent.

The first burst may include N doppler rounds of chirp signals, and each round includes M chirp signals. Transmission parameters such as transmission orders, signal quantities, and durations of the plurality of rounds of chirp signals are the same.

In addition, in the first burst, quantities of chirp signals sent by the transmit antennas may be the same or different from each other.

Figure 5:
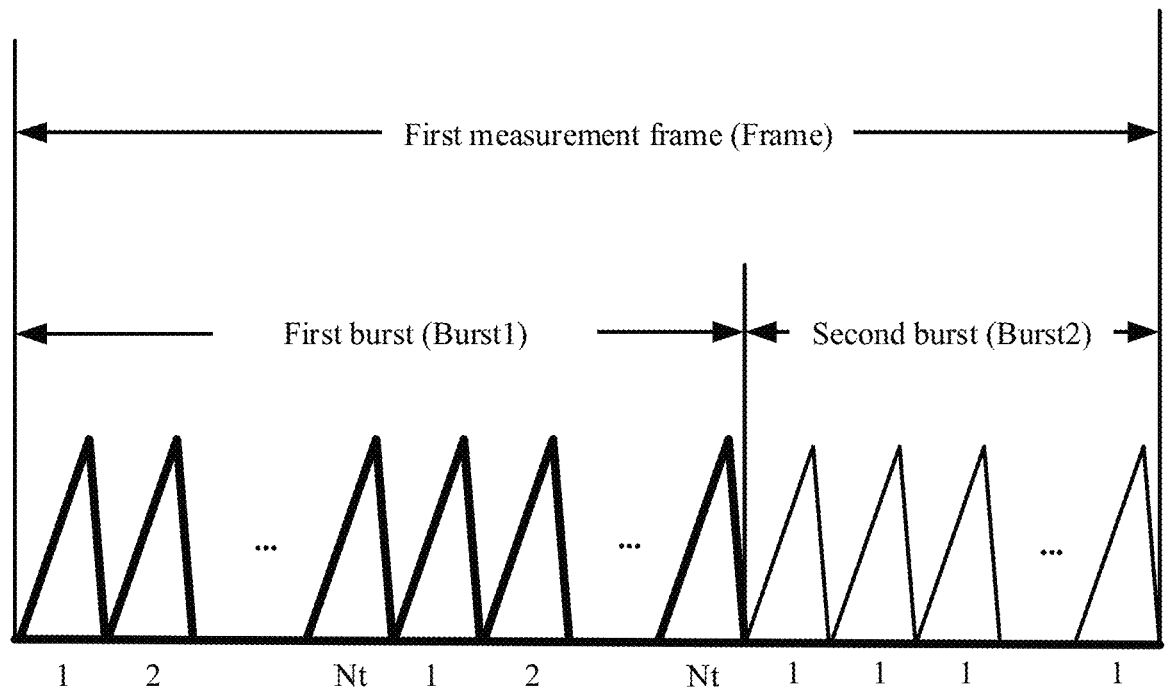
FIG. 5 is a schematic diagram of a chirp signal sent by a second MIMO radar according to an embodiment of this application.

For example, when sending the first burst, the Nt transmit antennas 1, 2, 3, . . . , Nt-2, Nt-1, and Nt send the Ndoppler rounds in an order of 1, 2, 3, . . . , Nt-2, Nt-1, and Nt (for example, N may be 32, 48, 64, 128 . . . ). Then, in the first burst, a quantity of chirp signals sent by each transmit antenna is N, that is, in the first burst, the quantities of chirp signals sent by the transmit antennas are the same, as shown in FIG. 5. In the example of FIG. 5, M=Nt.

For example, when sending the first burst, the Nt transmit antennas 1, 2, 3, . . . , Nt-2, Nt-1, and Nt send the Ndoppler rounds in an order of 1, 2, 3, . . . , Nt-2, Nt-1, and Nt (for example, N may be 32, 48, 64, 128 . . . ), and then the transmit antennas 1, 2, and 3 send three chirp signals. Then, in the first burst, quantities of chirp signals sent by the transmit antennas numbered 1, 2, and 3 are greater than quantities of chirp signals sent by other transmit antennas.

For example, when the Nt transmit antennas 1, 2, 3, . . . , Nt-2, Nt-1, and Nt send the first burst, a second transmit antenna further sends a chirp signal by interleaving in the first burst at the same time when each transmit antenna periodically sends a chirp signal. When the second transmit antenna sends a chirp signal by interleaving in the first burst, the second transmit antenna may periodically send a chirp signal, or may send a chirp signal aperiodically. The second transmit antenna and the first transmit antenna may be a same transmit antenna, or may be different transmit antennas. Apparently, in the first burst, a quantity of chirp signals sent by the second transmit antenna is greater than a quantity of chirp signals sent by another transmit antenna.

According to the foregoing solution, if the quantities of chirp signals sent by the transmit antennas in the first burst are the same, a calculation process is relatively simple when the velocity of the target is calculated based on echo signals formed after the first measurement frame is reflected. If the quantities of chirp signals sent by the transmit antennas in the first burst are different from each other, complexity of spectrum peak search can be further reduced by using a high-density transmit antenna.

In addition, in this embodiment of this application, before the transmitter performs S301 of sending a first burst in a first measurement frame, the method further includes: The transmitter sends a third burst in the first measurement frame. When the third burst is sent, a quantity of transmit antennas configured to send a chirp signal is one, and a transmit antennas configured to send the third burst and a transmit antennas configured to send the second burst are a same transmit antenna (that is, the first transmit antenna). The transmitter sends the first measurement frame at a duty cycle of P %, P<100, the duty cycle is equal to a ratio of a first duration to a second duration, the first duration is a duration of the first measurement frame, and the second duration is a time difference between two adjacent measurement frames sent by the transmitter.

Apparently, in the third burst, only the first transmit antenna sends a chirp signal, that is, the third burst is sent in the SIMO manner.

Figure 6:
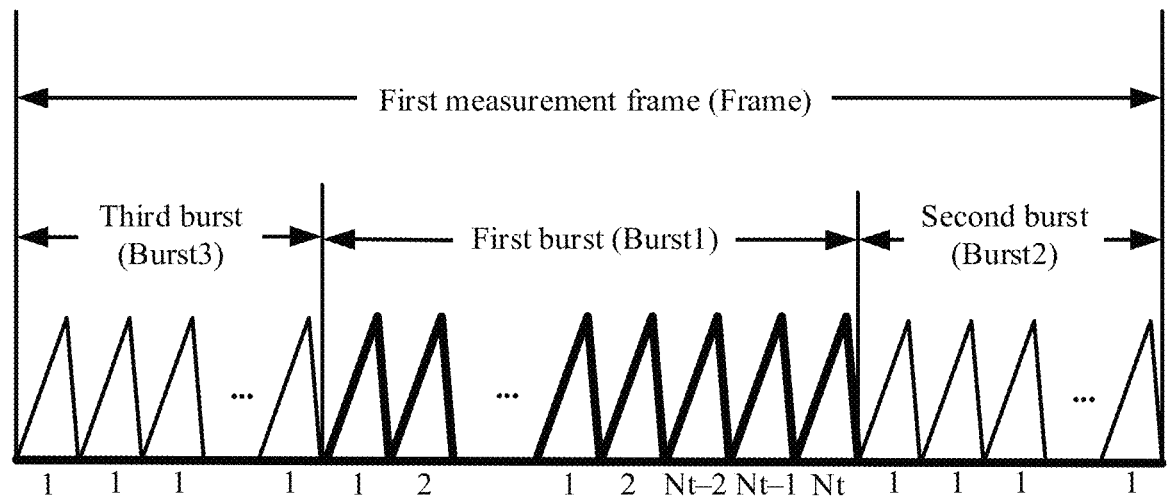
FIG. 6 is a schematic diagram of a chirp signal sent by a third MIMO radar according to an embodiment of this application.

For example, for the first measurement frame shown in FIG. 4, when the first burst (Burst1) is prefixed with the third burst (Burst3), the first measurement frame shown in FIG. 4 changes to a form shown in FIG. 6.

Three bursts are sent in the first measurement frame, where the first burst sent at a middle position is sent in a MIMO manner, and a prefix and a suffix of the first burst are sent in a SIMO manner. Then, when echo signals formed after the first measurement frame is reflected by one or more targets are processed, the two bursts sent in the SIMO manner may be selected for velocity matching, so that target velocity calculation is simpler. In addition, a problem that a scattering center of a fast moving target moves over a transmission time can be alleviated to some extent.

In an actual application, the transmitter sends the first measurement frame at the duty cycle of P %, and P<100. That is, after the first measurement frame is sent, there is an idle time and a processing time before a next measurement frame is sent. To this end, the duty cycle P % exists, and P<100. In engineering, if P=100, system power consumption is relatively high. Therefore, P<100 is generally used.

For example, under a design constraint that an update period is 20 Hz, each measurement frame cannot be greater than 50 milliseconds (ms). It is assumed that the duration T1 of each chirp signal is 20 microseconds (s), and in the first burst, each of the 12 transmit antennas sends Ndoppler chirp signals, and Ndoppler=64. Then, a coherent processing interval (coherent processing interval, CPI) in the first burst is 20*64*12=15.36 ms. In addition, in the second burst, the first transmit antenna performs repeated transmission M2 times, and when M2=192, a CPI in the second burst is 20*192=3.84 ms. Therefore, the duty cycle may be calculated as (15.36+3.84)/50=38.4%. That is, in a measurement period, a time for sending a chirp signal is 19.2 ms, and a time for processing or an idle time is 50-19.2=30.8 ms.

Figure 7:
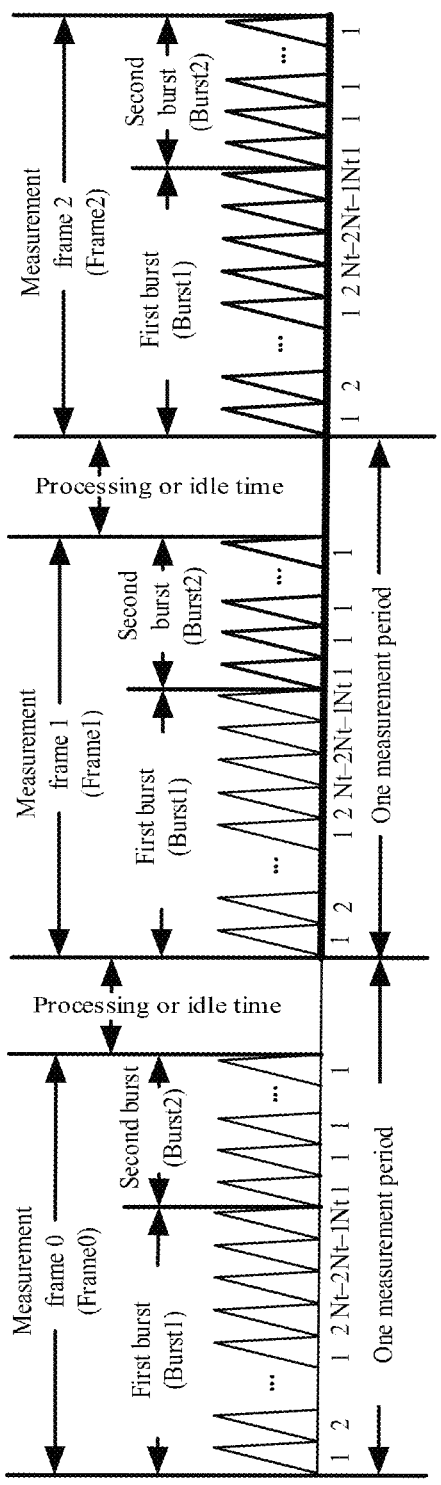
FIG. 7 is a schematic diagram of a chirp signal sent by a fourth MIMO radar according to an embodiment of this application.

For example, when the first measurement frame sent by the transmitter is in the form shown in FIG. 4, if the duty cycle P is less than 100, the transmitter may send three measurement frames shown in FIG. 7. It can be learned from FIG. 7 that, after the first measurement frame is sent, there is still a processing and idle time. The radar system may process, within the processing or idle time, echo signals formed after the first measurement frame is reflected by the target, or no processing is performed within the processing or idle time, and just no chirp signal is sent.

In addition, after the transmitter sends the first measurement frame, the method further includes: The transmitter sends a fourth burst in a second measurement frame. The second measurement frame is used to measure the velocity of the target, and when the fourth burst is sent, each of the plurality of transmit antennas sends a chirp signal in the time division manner. The transmitter sends a fifth burst in the second measurement frame after the transmitter sends the fourth burst in the second measurement frame. When the fifth burst is sent, a quantity of transmit antennas configured to send a chirp signal is one, and transmission parameters of the fifth burst, the second burst, and the third burst are the same. The transmission parameter includes a transmission slope, a transmit antenna, a quantity of transmitted chirp signals, a duration of each chirp signal, and the like.

If the transmission parameters of the fifth burst, the second burst, and the third burst are the same, when the velocity of the target is calculated, the second burst in the first measurement frame may be considered as a SIMO prefix in the second measurement frame, to reduce transmission overheads.

Figure 8:
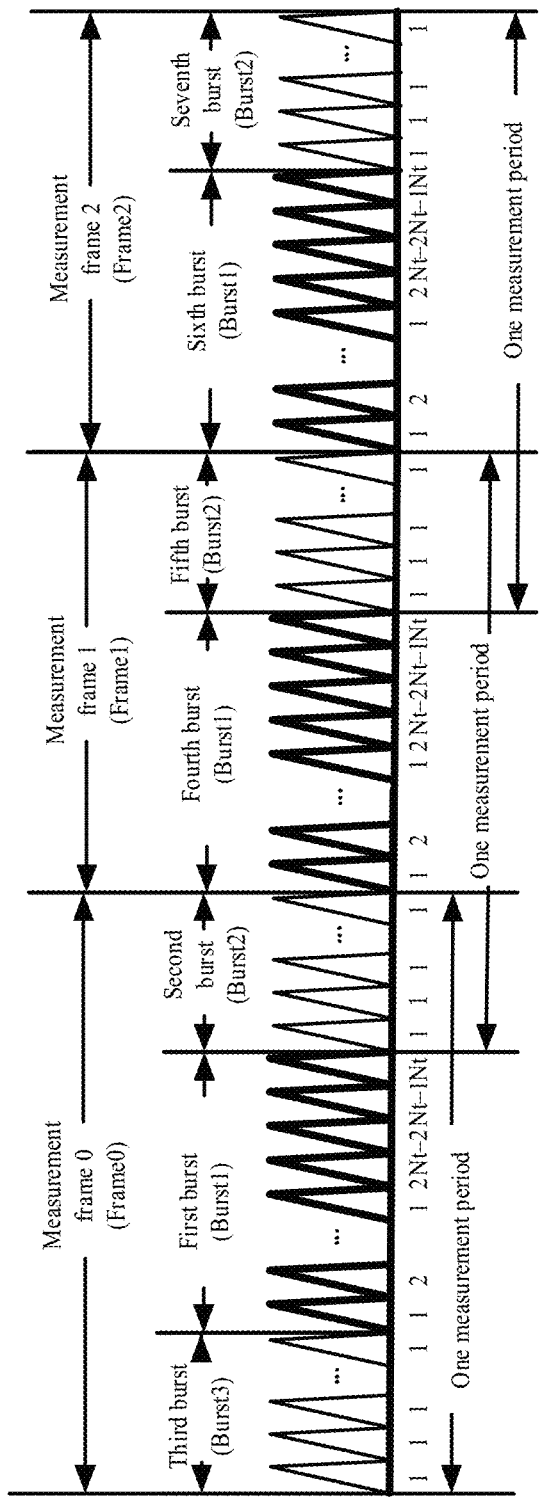
FIG. 8 is a schematic diagram of a chirp signal sent by a fifth MIMO radar according to an embodiment of this application.

For example, as shown in FIG. 8, a first measurement frame (Frame0) sent by the transmitter includes three bursts: Burst3 (equivalent to the third burst), Burst1 (equivalent to the first burst), and Burst2 (equivalent to the second burst), and transmission parameters of Burst3 and Burst2 are the same. Then, a second measurement frame (Frame1) may include only Burst1 (equivalent to the fourth burst) and Burst2 (equivalent to the fifth burst). When the velocity of the target is calculated, Burst2 in the first measurement frame may be considered as a SIMO prefix in the second measurement frame. Similarly, a third measurement frame (Frame2) also includes only Burst1 and Burst2, and the third measurement frame reuses Burst2 in the second measurement frame.

In conclusion, according to the signal transmission method provided in this embodiment of this application, the first burst sent in the MIMO manner is suffixed with the second burst sent in the SIMO manner, and target velocity range search may be performed based on an echo signal formed after the first burst is reflected and an echo signal formed after the second burst is reflected, to obtain a velocity aliasing coefficient of one or more targets by matching, and resume a velocity measurement range of the MIMO radar to a velocity measurement range of a SIMO radar.

Corresponding to the signal transmission method shown in FIG. 3, an embodiment of this application further provides a signal processing method, to process echo signals formed after a transmitted measurement frame is reflected by one or more targets, so as to obtain a velocity of the one or more targets, and obtain an azimuth angle (for example, a horizontal azimuth angle and a vertical azimuth angle) of the one or more targets.

Figure 9:
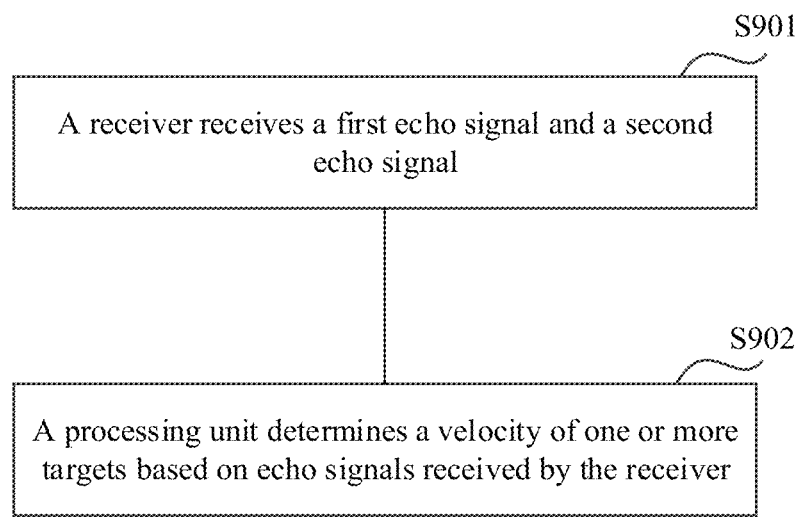
FIG. 9 is a schematic diagram of a flowchart of a signal processing method according to an embodiment of this application.

The method is applied to a MIMO radar, the MIMO radar includes a transmitter, a receiver, and a processing unit, the transmitter includes a plurality of transmit antennas, and the receiver includes a plurality of receive antennas. Refer to FIG. 9. The method includes the following steps.

Step S901. The receiver receives a first echo signal and a second echo signal.

The first echo signal is formed after a first burst in a measurement frame sent by the transmitter is reflected by one or more targets, the second echo signal is formed after a second burst in the measurement frame is reflected by the one or more targets, and the second burst is sent after the first burst. When the first burst is sent, each of the plurality of transmit antennas sends a chirp signal in a time division manner. When the second burst is sent, a quantity of transmit antennas configured to send a chirp signal is one.

In step S901, the echo signals received by the receiver are echo signals formed after the first measurement frame sent by the transmitter in the method shown in FIG. 3 is reflected by the one or more targets.

It should be noted that, in this embodiment of this application, the receiver includes Nr receive antennas, and the Nr receive antennas receive Nt echo signals based on a transmission order of the Nt transmit antennas. Then, the received echo signals are converted into the first echo signal and the second echo signal based on a position relationship between the Nt transmit antennas and the Nr receive antennas and the transmission order of the transmit antennas.

Step S902: The processing unit determines a velocity of the one or more targets based on echo signals received by the receiver.

In Step S902, that the processing unit determines a velocity of the one or more targets based on echo signals received by the receiver may be implemented in the following manner: The processing unit determines a first identifier based on the first echo signal. The first identifier is used to indicate a distance measurement value and a velocity measurement value of the one or more targets. The processing unit determines a second identifier based on the second echo signal. The second identifier is used to indicate a distance measurement value and a velocity measurement value of the one or more targets. The processing unit determines the velocity of the one or more targets based on the first identifier and the second identifier.

The first identifier may include a first velocity identifier and a first distance identifier, and the second identifier may include a second velocity identifier and a second distance identifier. After the first echo signal is obtained, a range doppler (RD) map may be obtained by performing operations such as one-dimensional FFT (1D-FFT), two-dimensional FFT (2D-FFT), and coherent combining/non-coherent combining, and then a first velocity identifier (Vind_MIMO) and a first distance identifier (Rind_MIMO) within a maximum velocity measurement range of MIMO are obtained through detection based on the RD map. Similarly, after the second echo signal is obtained, another RD map may be obtained by performing operations such as 1D-FFT, 2D-FFT, and coherent combining/non-coherent combining, and then a second velocity identifier (Vind_SIMO) and a second distance identifier (Rind_SIMO) within a maximum velocity measurement range of SIMO are obtained through detection based on the RD map.

When detection is performed based on the RD map, there may be a plurality of detection methods, including but not limited to, common detection methods such as ordered statistic-constant false alarm rate (OS-CFAR) detection or cell averaging-constant false alarm rate (CA-CFAR) detection. This is not specifically limited in this embodiment of this application.

In addition, because a SIMO burst (that is, the second burst) and a MIMO burst (that is, the first burst) may have different durations and transmit power, CFAR thresholds used for the first burst and the second burst may be different. For example, a relatively low threshold is used in the SIMO burst, and a relatively high threshold is used in the MIMO burst, to ensure that for each target detected in the MIMO burst, a point that is relatively matched in distance can be found from a target detected in the SIMO burst for velocity expansion.

The first identifier and the second identifier that are obtained in the foregoing manner are only used to indicate a possible distance and velocity of the target, and target velocity aliasing exists. To determine the velocity of the target, the first identifier and the second identifier need to be further processed.

The processing unit determines the velocity of the one or more targets based on the first identifier and the second identifier may be implemented in the following manner: The processing unit determines, based on a transmission repetition period of a first transmit antenna in the first burst, an aliasing coefficient interval corresponding to the first identifier. The processing unit determines an aliasing coefficient subset based on the first identifier, the second identifier, and the aliasing coefficient interval. The processing unit determines a velocity aliasing coefficient based on the aliasing coefficient subset. The processing unit determines the velocity of the one or more targets based on the velocity aliasing coefficient and the first identifier.

The following separately describes each of the foregoing steps in detail.

1. Determine an Aliasing Coefficient Interval Corresponding to the First Identifier It is assumed that the first burst includes Ndoppler rounds of chirp signals, and each round includes M chirp signals. Then, if M is an even number, the aliasing coefficient interval is [−M/2, M/2−1]. If M is an odd number, the aliasing coefficient interval is [−M−1/2, M−1/2].

For example, if M=15, the aliasing coefficient interval is [−7,−6,−5,−4,−3,−2,−1, 0, 1, 2, 3, 4, 5, 6, 7]. For example, if M=12, the aliasing coefficient interval is [−6,−5,−4,−3,−2,−1, 0, 1, 2, 3, 4, 5].

2. Determine an Aliasing Coefficient Subset Based on the First Identifier, the Second Identifier, and the Aliasing Coefficient Interval A velocity measurement range in a SIMO burst is M times that in a MIMO burst. Therefore, if there is only one target at a same distance in the two bursts, an aliasing coefficient interval corresponding to the MIMO can actually be accurately obtained. When a plurality of targets exist in a distance interval, an element in the aliasing coefficient interval may be obtained by matching based on the second velocity identifier of the SIMO burst, and after matching for the plurality of targets, a union set may be obtained from matched elements, and only non-repeated parts are retained to form the aliasing coefficient subset.

For example, assuming that the SIMO burst and the MIMO burst have a range resolution of 0.1 m and a distance measurement range is 51.2 m, the RD map is divided into 512 cells (RD cells) in distance. A velocity identifier of a corresponding distance unit of a detected target in the SIMO burst and the MIMO burst within a specific threshold is obtained. When a sending time of the SIMO burst is four times a sending time of the MIMO burst, a velocity resolution in the SIMO burst is four times a velocity resolution of the MIMO burst. Then, each cell in a velocity dimension in the SIMO burst is equivalent to four cells in a velocity dimension in the MIMO burst. In addition, when the velocity resolution of the MIMO burst is dv_MIMO, the velocity resolution of the SIMO burst is 4*dv_MIMO. When M=12, the velocity measurement range is Vmax_SIMO=12*Vmax_MIMO, and the entire velocity measurement range of the SIMO is divided into 3*Vind_max_MIMO cells. That is, a value range of Vind_SIMO is 0 to 3*Vind_max_MIMO−1. The velocity resolution in the MIMO burst is dv_MIMO, the velocity measurement range is Vmax_MIMO, and the entire MIMO velocity measurement range is divided into Vind_max_MIMO cells. That is, a value range of Vind_MIMO is 0 to Vind_max_MIMO−1. The second velocity identifier obtained in the SIMO may be converted to a corresponding aliasing coefficient interval of the MIMO by using a formula floor (4*Vmd_SIMO/Vind_max_MIMO), to obtain an element in the aliasing coefficient interval. For example, floor (4*Vind_SIMO/Vind_max_MIMO)=0 corresponds to the first element of [−6,−5,−4,−3,−2,−1, 0, 1, 2, 3, 4, 5], which is −6. After the foregoing operations are performed for each target, all obtained elements may be combined and a repeated element may be deleted, to obtain the aliasing coefficient subset.

Apparently, the aliasing coefficient subset is a subset of the aliasing coefficient interval.

In addition, after the RD map is obtained by performing the foregoing solution, based on (Rind_MIMO, Vind_MIMO) and the order in which the transmit antennas send chirp signals in the first burst, compensation may be further performed on echo signals received by receive antennas.

For example, the following formula may be obtained based on a phase of an echo signal of a receive antenna corresponding to a transmit antenna in each timeslot:

$$S_{TX}^m(f_D^{SIMO}) = S_{TX}^m(f_D^{MIMO}) * e^{-i2\pi \frac{a_{coef}*m}{M}}, m \in [0, M-1]$$

$$a_{coef} \in \begin{cases} \left[-\frac{M-1}{2}, \frac{M-1}{2}\right] &, M \text{ is an odd number} \\ \left[-\frac{M}{2}, \frac{M}{2}-1\right] &, M \text{ is an even number} \end{cases}$$

$S_{TX}^m(f_D^{MIMO})$ corresponds to a phase of echo signals of the Nr receive antennas corresponding to a transmit antennas in an mth timeslot in the first burst. $S_{TX}^m(f_D^{MIMO})$ corresponds to Nr corresponding received echo signals when m antennas all transmit a chirp signal in a first timeslot in the second burst, $f_D^{MIMO}$ is a doppler frequency that is observed on the RD map and that corresponds to the velocity of the target within the maximum velocity measurement range of the TDM MIMO, and $f_D^{SIMO}$ is a doppler frequency corresponding to the velocity of the target within a to-be-resumed maximum velocity measurement range of the SIMO. In addition, apparently, a value range of $\alpha^{coef}$ is the foregoing aliasing coefficient interval. However, in an actual application of this embodiment of this application, $\alpha_{coef}$ may only need to be an element in the aliasing coefficient subset.

$$e^{-i2\pi \frac{a_{coef}*m}{M}}$$

is a phase compensation value of echo signals of the Nr receive antennas corresponding to transmit antennas in m timeslots. After first identifier information in a SIMO burst echo is used, less values requiring phase compensation may be obtained.

Therefore, there are a plurality of manners for determining the aliasing coefficient subset S based on the first identifier and the second identifier, and two of the manners are listed below.

Manner 1

An aliasing coefficient subsets in an entire scenario is calculated based on Rind_SIMO and Vind_SIMO of all target points.

An aliasing coefficient that Vind_SIMO detected in the second burst corresponds to that in the first burst is calculated based on the chirp signal transmission parameters of the first burst and the second burst.

For example, in the first burst, G*Nt is a round of chirp signals (Nt is a quantity of transmit antennas, G is a quantity of chirp signals sent by each transmit antenna in a round, and the first burst may include a plurality of rounds of chirp signals), and in a round of chirp signals, $N_{burst1\_doppler}$ chirp signals are transmitted in total (or $N_{burst1\_doppler}$ chirp signals are transmitted after zeros are added). In the second burst, $N_{burst2\_doppler}$ chirp signals are transmitted in total (or $N_{burst2\_doppler}$ chirp signals are transmitted after zeros are added). A repetition period of a transmit antenna in the first burst is Tc_MIMO, and a repetition period of a transmit antenna in the second burst is Tc_SIMO. Assuming that Tc_MIMO=G*Nt*Tc_SIMO, a velocity measurement range of the second burst is equivalent to G*Nt times that of the first burst. That is, Vind_SIMO is equivalent to dividing a G*Nt*Vmax_MIMO interval into $N_{burst2\_doppler}$ cells, and Vind_MIMO is equivalent to dividing a Vmax_MIMO interval into $N_{burst1\_doppler}$ intervals. Then, for each Vind_SIMO in the second identifier, an element that is in the foregoing aliasing coefficient interval and that corresponds to floor (Vind_SIMO/($N_{burst2\_doppler}$/G*Nt)) may be obtained. Therefore, for each detected Vind_SIMO, a corresponding element in the aliasing coefficient interval may be obtained by solving, and a union set is obtained based on all elements, and a repeated element is deleted, to obtain the aliasing coefficient subset S.

In Manner 1, it is unnecessary to obtain an aliasing coefficient subset for each target, but instead, all detected Rind_SIMO and Vind_SIMO are processed together. However, in a case of a complex environment and a large quantity of targets, search and calculation workload in Manner 1 are relatively heavy.

Manner 2

Because distances of targets are not aliased, Rind_SIMO and a distance reflected by Rind_SIMO are generally real. Then, for a same target, abs (Rind_SIMO−Rind_MIMO) is generally less than a threshold, and then an aliasing coefficient subset is calculated for each target. A specific calculation process is similar to that in Manner 1, and details are not described herein again.

A specific value of the threshold may be adaptively adjusted based on parameters such as the second velocity identifier and a length of the first burst. For example, it is assumed that transmission center times of the first burst and the second burst are separated by Tgap, and for Rind_SIMO obtained in the second burst, due to existence of the time difference Tgap, a target with a velocity V may move K distance cells (on the RD map) in the time Tgap. Then, the threshold may be determined based on the second velocity identifier obtained in the second burst and an aliasing coefficient subset whose periphery of a distance unit is less than K distance cells in the first burst.

In Manner 2, an aliasing coefficient subset is solved on each distance cell to implement finer velocity matching. However, calculation complexity of threshold comparison is introduced during calculation.

3. Determine a Velocity Aliasing Coefficient Based on the Aliasing Coefficient Subset After the aliasing coefficient subset is determined, the velocity aliasing coefficient may be determined in two manners.

Manner 1: Overlapping Manner

A manner in which two transmit antennas at overlapping physical positions send chirp signals in two adjacent timeslots may be referred to as overlapping. A phase difference between receive antennas corresponding to two or more adjacent timeslots at an overlapping moment is determined only by a doppler phase caused by a velocity of a target. Therefore, a corresponding velocity aliasing coefficient may be directly obtained by matching by using velocity identifiers of the target that are calculated on the two transmit antennas at overlapping physical positions.

In this embodiment of this application, overlapping may be constructed in a process of sending the first burst and the second burst, to solve the velocity aliasing coefficient subset.

Herein, there may be a plurality of specific methods for calculating the velocity aliasing coefficient. A method may be performing conjugate multiplication on corresponding received echo data in an aliasing coefficient subset of a soft overlapping pair (two adjacent form a pair) after doppler phase compensation and original overlapping signals, performing summation on the plurality of received signals, and finding an aliasing coefficient corresponding to a minimum value in a plurality of aliasing coefficients included in the aliasing coefficient subset as the velocity aliasing coefficient. Alternatively, the velocity aliasing coefficient is calculated by directly averaging phase differences of a plurality of soft overlapping pairs.

Manner 2: Angular Spectrum Peak Search Manner

After the aliasing coefficient subset is determined, values, on different angular spectra, of received signals of subarrays corresponding to different elements in the aliasing coefficient subset S may be calculated, and an element that is in the aliasing coefficient subset S and that corresponds to a maximum value of the angular spectra is used as the velocity aliasing coefficient.

In an actual application, the transmit antennas are configured to transmit a measurement frame, and the receive antennas are configured to receive echo signals formed after the measurement frame is reflected by a target. The antenna array may be virtualized into a virtual array including a plurality of virtual transmit and receive channels. The processing unit may convert a received echo signal into an observation result of the virtual array, to perform processing and calculation based on the observation result of the virtual array, so as to obtain information such as a distance, a velocity, and an azimuth angle of the target.

When positions of the transmit antenna array and the receive antenna array are determined, a position of the virtual array can be determined uniquely. Assuming that Pm is coordinates of an antenna m (m=0, 1, ..., Ntx-1) in Ntx transmit antennas, Qn is a coordinate position of an antenna n (n=0, 1, ..., Nrx-1) in Nrx receive antennas, a position of an array element in a formed virtual antenna array may be uniquely determined by Pm+Qn. After m traverses the Ntx transmit antennas and n traverses the Nrx receive antennas, a position of the virtual antenna array can be determined. Mathematically, the combined virtual array is Avirtual=kron (At, Ar), where At and Ar are the transmit antenna array and the receive antenna array, respectively.

In Manner 2, FFT or digital beamforming (DBF) is performed based on an observation result of the virtual array in a process of calculating an angular spectrum.

If the virtual array is a uniform array, the FFT operation can be accelerated. However, in an actual application, if the virtual array is a uniform array or a non-uniform array with a relatively large quantity of array elements, a virtual MIMO subarray of the uniform array may be constructed, and FFT is performed on an observation result of the virtual MIMO subarray, to calculate the angular spectrum. All array elements in the virtual MIMO subarray are equally spaced, and each transmit antenna corresponds to a same quantity of virtual array elements in the virtual MIMO subarray.

In a possible example, that the processing unit determines a velocity aliasing coefficient based on the aliasing coefficient subset includes: The processing unit determines an observation result of a virtual MIMO subarray based on the echo signals received by the receiver. The processing unit determines the velocity aliasing coefficient based on the observation result of the virtual MIMO subarray. The virtual MIMO subarray is a uniform planar subarray or a uniform linear subarray including virtual array elements in a virtual array, each transmit antenna corresponds to a same quantity of virtual array elements in the virtual MIMO subarray, and the virtual array includes a plurality of transmit antennas and a plurality of receive antennas included in the receiver.

Figure 10:
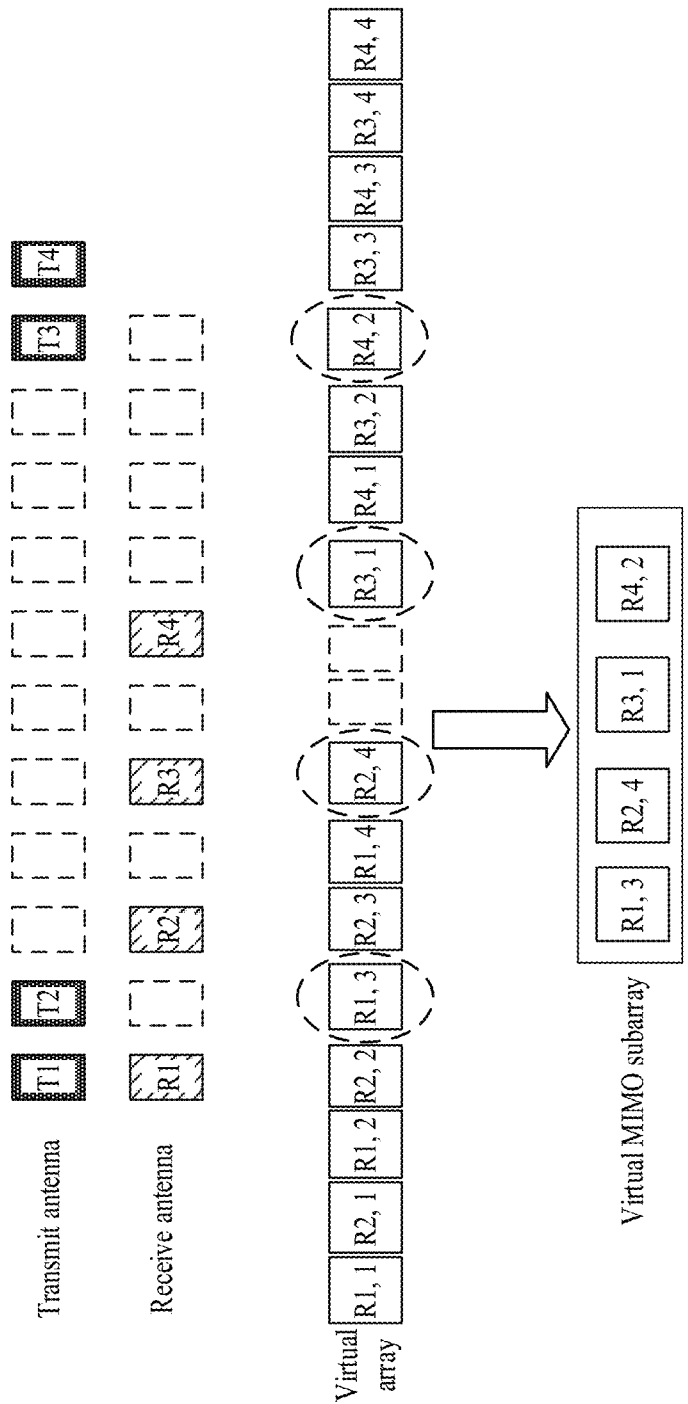
FIG. 10 is a schematic diagram of a first virtual MIMO subarray according to an embodiment of this application.

For example, positions of transmit antennas T1, T2, T3, and T4, and receive antennas R1, R2, R3, and R4 and a formed virtual array may be shown in FIG. 10. Then, four array elements are selected from the virtual array to form a virtual MIMO subarray (there are two vacant positions in the virtual array formed by the transmit antenna array and the receive antenna array, and subarray extraction avoids the two non-uniform subarrays), and FFT is performed on an observation result of the virtual MIMO subarray, to calculate an angular spectrum.

Figure 11:
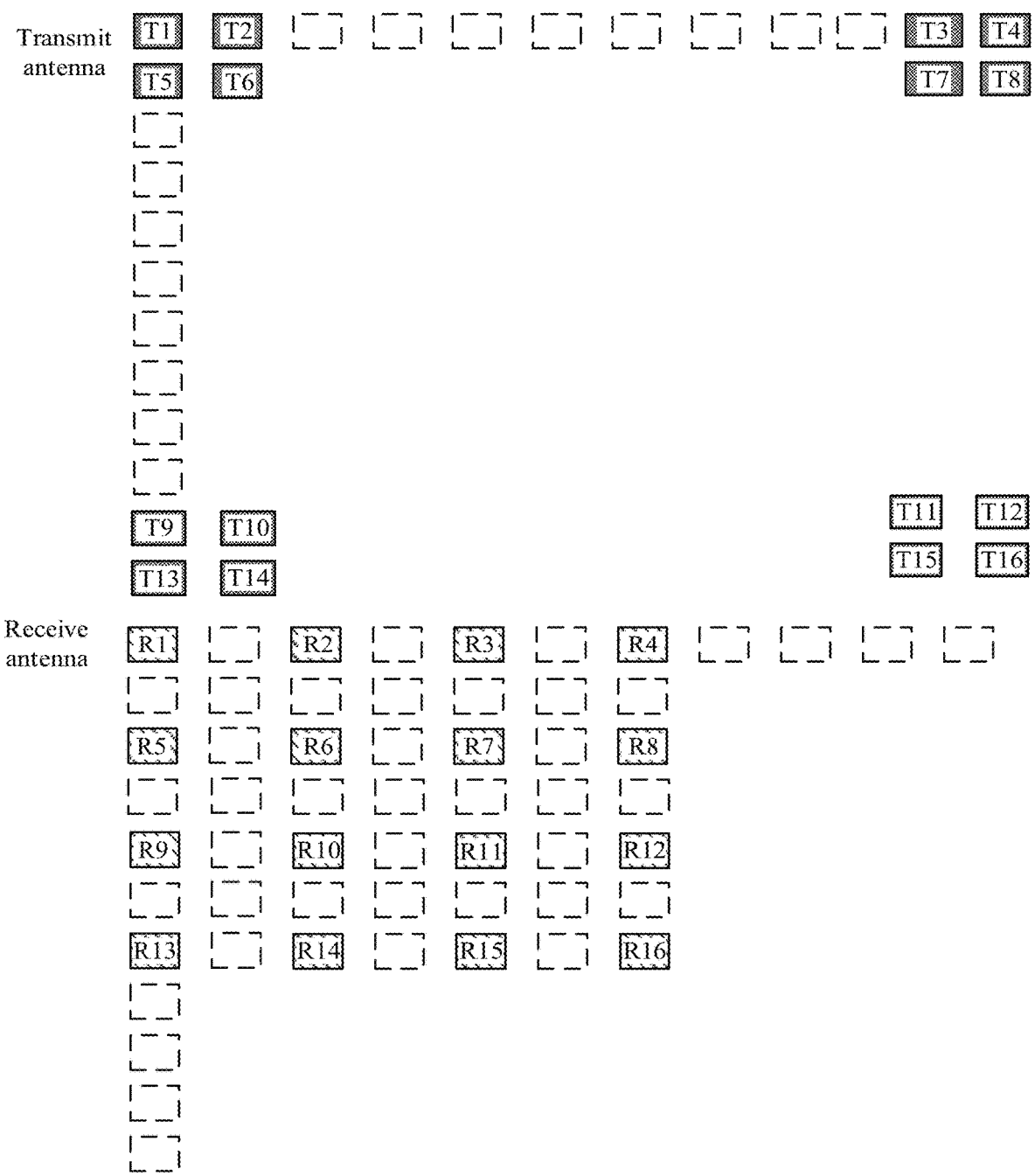
FIG. 11 is a schematic diagram of an antenna array according to an embodiment of this application.
Figure 12:
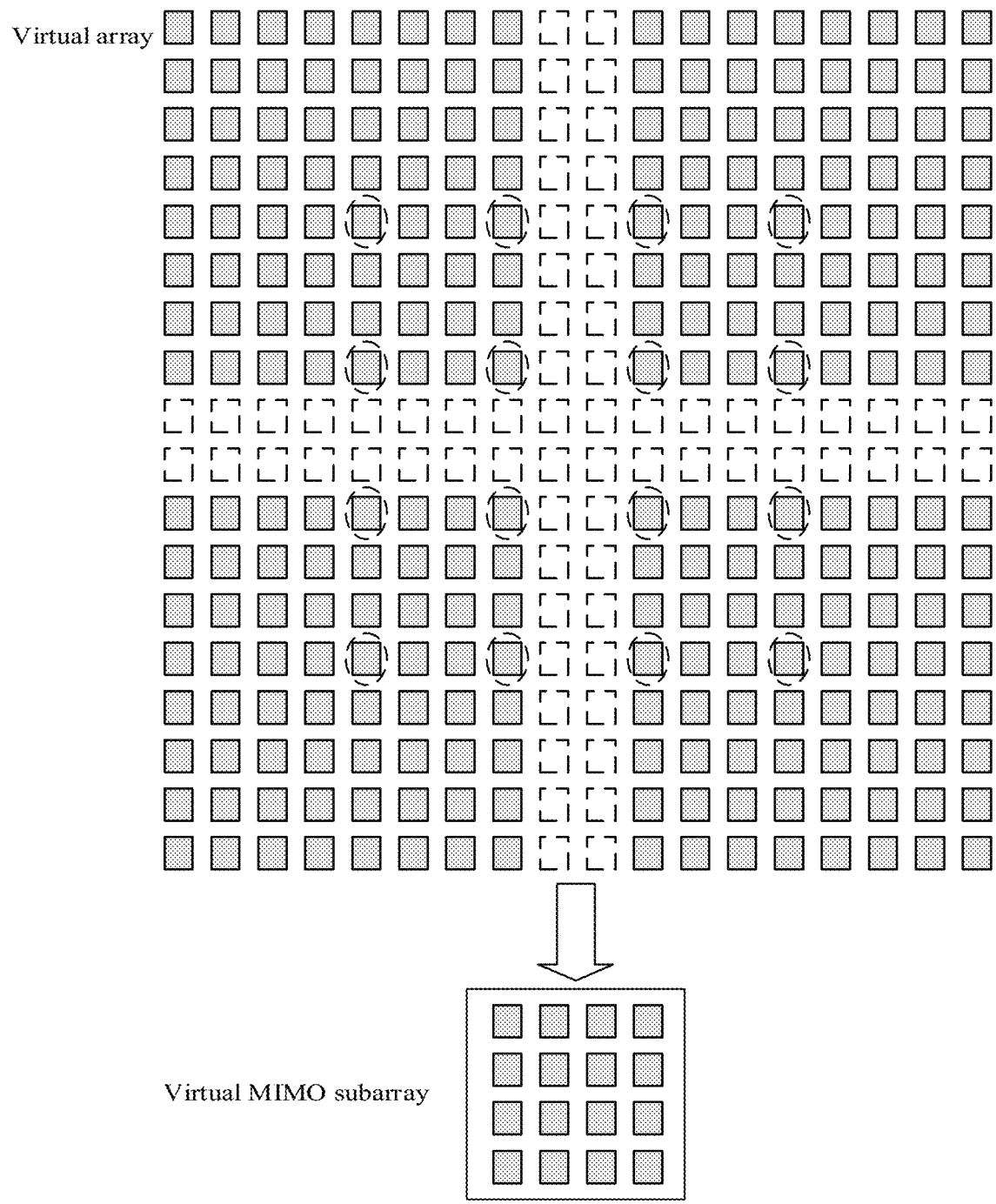
FIG. 12 is a schematic diagram of a second virtual MIMO subarray according to an embodiment of this application.

For example, positions of transmit antennas and receive antennas are shown in FIG. 11, and a formed virtual array is shown in FIG. 12. Then, 16 array elements are selected from the virtual array to form a virtual MIMO subarray, and FFT is performed on an observation result of the virtual MIMO subarray, to calculate an angular spectrum.

In a possible example, that the processing unit determines a velocity aliasing coefficient based on the aliasing coefficient subset includes: The processing unit determines an observation result of a virtual MIMO subarray based on the echo signals received by the receiver. The processing unit determines the velocity aliasing coefficient based on the observation result of the virtual MIMO subarray. The virtual MIMO subarray is a uniform planar subarray or a uniform linear subarray including virtual array elements in a virtual array, the uniform planar subarray and the uniform linear subarray are obtained by linear interpolation, each transmit antenna corresponds to a same quantity of virtual array elements in the virtual MIMO subarray, and the virtual array includes a plurality of transmit antennas and a plurality of receive antennas included in the receiver.

That is, if a virtual MIMO subarray meeting the condition (that is, all array elements in the MIMO subarray are equally spaced, and each transmit antenna corresponds to a same quantity of virtual array elements in the virtual MIMO subarray) cannot be found in the virtual array, the virtual MIMO subarray may be formed by linear interpolation.

Figure 13:
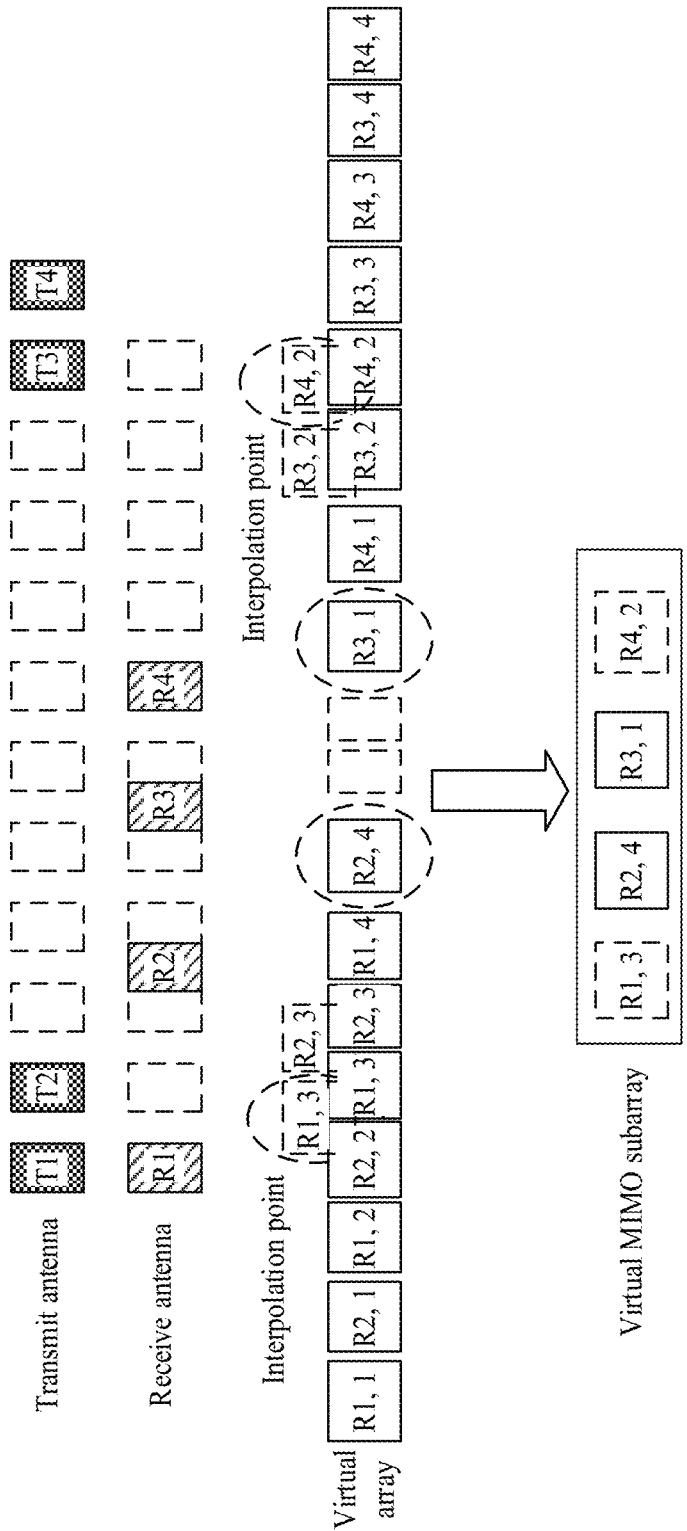
FIG. 13 is a schematic diagram of a third virtual MIMO subarray according to an embodiment of this application.

For example, positions of transmit antennas T1, T2, T3, and T4 and receive antennas R1, R2, R3, and R4 and a formed virtual array may be shown in FIG. 13. Apparently, a virtual MIMO subarray meeting the condition cannot be found in the virtual array (R1, 3 and R4, 2 marked by solid lines cannot form a subarray with R2, 4 and R3, 1). Then, a corresponding array element may be found by interpolation to form a virtual MIMO subarray, and calculate an angular spectrum. An observation result of an interpolation point may be obtained in a manner such as calculating an average value.

After the velocity aliasing coefficient is determined, the processing unit may determine the velocity of the one or more targets based on the velocity aliasing coefficient and the first identifier. For a specific manner, refer to descriptions in a conventional technology. Details are not described herein.

In addition, the method shown in FIG. 9 may further include receiving, by the receiver a third echo signal. The third echo signal is formed after a third burst in the measurement frame is reflected by the one or more targets, and the third burst is sent before the first burst. Then, that the processing unit determines a velocity of the one or more targets based on echo signals received by the receiver may be implemented in the following manner: If the one or more targets move away from the radar system, the processing unit determines the velocity of the one or more targets based on the first echo signal and the third echo signal. If the one or more targets move close to the radar system, the processing unit determines the velocity of the one or more targets based on the first echo signal and the second echo signal.

In other words, a prefix (the third burst) is used for matching for a target getting away, and a suffix (the second burst) is used for matching for a target getting close.

Because a target actually moves in the three bursts, for a distant target, such movement affects strength of a received signal from the target. When the target gets away, a distance to the target in the second burst is longer, the strength of the signal from the target is reduced, and then data in the third burst is more reliable. When the target gets close, the distance to the target in the second burst is shorter, the strength of the signal from the target is increased, and then data in the second burst is more reliable.

A specific manner of determining the velocity of the one or more targets based on the first echo signal and the third echo signal may be the foregoing implementation of determining the velocity of the one or more targets based on the first echo signal and the second echo signal, and details are not described herein again.

In addition, if the measurement frame sent by the transmitter includes three bursts, the processing unit may further perform clustering and tracking based on target points that have consistent data as measured in the second burst and the third burst that are two bursts sent in the SIMO manner.

A reason for using SIMO for clustering and tracking is that it is found by processing actual data that a point with a relatively high velocity is determined inconsistently in a SIMO burst and a MIMO burst. This is caused by micro-doppler and multipath of a target.

A micro-doppler feature of a part of the target causes inconsistency between a macro velocity and a micro velocity of the target. For example, a velocity of a vehicle wheel and a velocity of a vehicle body are different, a velocity of a human arm and a velocity of a human body are different. In multipath reflection, a measured distance and velocity of the target are both greater than a real distance and velocity of the target. As a result, velocity results of the SIMO burst and the MIMO burst is largely different. Therefore, target points with consistent data may be used for clustering and tracking, to obtain a correct macro velocity of the target and predict a motion state of the target based on the macro velocity.

In conclusion, according to the signal processing method shown in FIG. 9, target velocity range search may be performed by using an echo signal formed after the first burst sent in a MIMO manner is reflected and an echo signal formed after the second burst sent in a SIMO manner after the first burst is reflected, to obtain a velocity aliasing coefficient of one or more targets by matching, and resume a velocity measurement range of the MIMO radar to a velocity measurement range of a SIMO radar.

Figure 14:
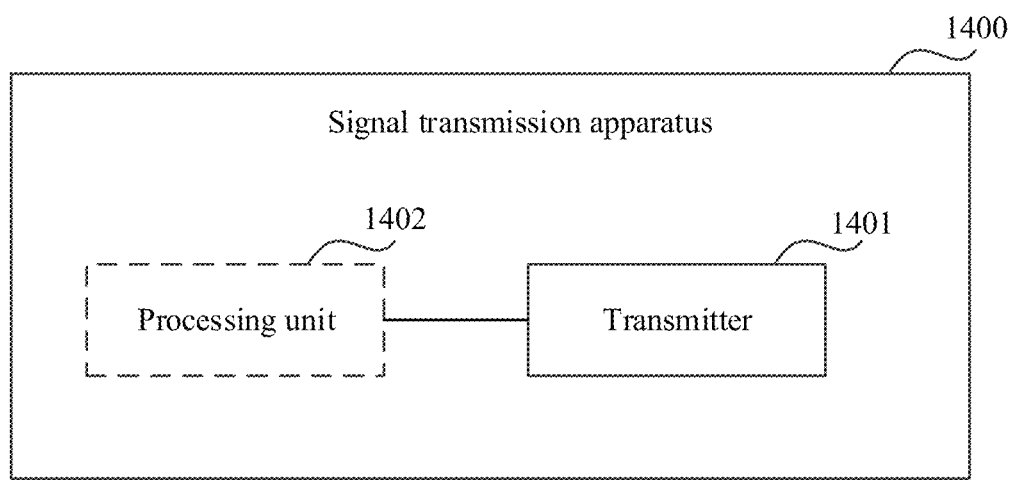
FIG. 14 is a schematic diagram of a structure of a signal transmission apparatus according to an embodiment of this application.

An embodiment of this application provides a signal transmission apparatus. The signal transmission apparatus may be configured to perform the signal transmission method shown in FIG. 3. Referring to FIG. 14, the signal transmission apparatus includes a transmitter 1401.

The transmitter 1401 includes a plurality of transmit antennas, and the transmitter 1401 is configured to send a first burst in a first measurement frame, where the first measurement frame is used to measure a velocity of a target, and when the first burst is sent, each of the plurality of transmit antennas sends a chirp signal in a time division manner; and send a second burst in the first measurement frame after sending the first burst in the first measurement frame, where when the second burst is sent, a quantity of transmit antennas configured to send a chirp signal is one.

Optionally, the transmitter 1401 is further configured to send a third burst in the first measurement frame before sending the first burst in the first measurement frame. When the third burst is sent, a quantity of transmit antennas configured to send a chirp signal is one, and a transmit antennas configured to send the third burst and a transmit antennas configured to send the second burst are a same transmit antenna. The transmitter 1401 sends the first measurement frame at a duty cycle of P %, P<100, the duty cycle is equal to a ratio of a first duration to a second duration, the first duration is a duration of the first measurement frame, and the second duration is a time difference between two adjacent measurement frames sent by the transmitter 1401.

Optionally, the transmitter 1401 is further configured to send a fourth burst in a second measurement frame after sending the first measurement frame, where the second measurement frame is used to measure the velocity of the target, and when the fourth burst is sent, each of the plurality of transmit antennas sends a chirp signal in the time division manner; and send a fifth burst in the second measurement frame after sending the fourth burst in the second measurement frame, where when the fifth burst is sent, a quantity of transmit antennas configured to send a chirp signal is one, and transmission parameters of the fifth burst, the second burst, and the third burst are the same.

The transmission parameter includes one or more of the following: a transmission slope, a transmit antenna, a quantity of sent chirp signals, or a duration of each chirp signal.

Optionally, the first measurement frame is any one of an FMCW, an MFSK, or a PMCW.

Optionally, in the first burst, quantities of chirp signals sent by the plurality of transmit antennas are different from each other.

Optionally, the signal transmission apparatus 1400 further includes a processing unit 1402 configured to determine a configuration of the first measurement frame and send the configuration of the first measurement frame to a monolithic microwave integrated circuit MMIC by using an interface. The MMIC is configured to enable, based on the configuration of the first measurement frame, the transmitter to send the first measurement frame.

It should be noted that, the signal transmission apparatus 1400 shown in FIG. 14 may be configured to perform the signal transmission method shown in FIG. 3. For an implementation that is not described in detail in the signal transmission apparatus 1400, refer to related descriptions in the signal transmission method shown in FIG. 3.

Figure 15:
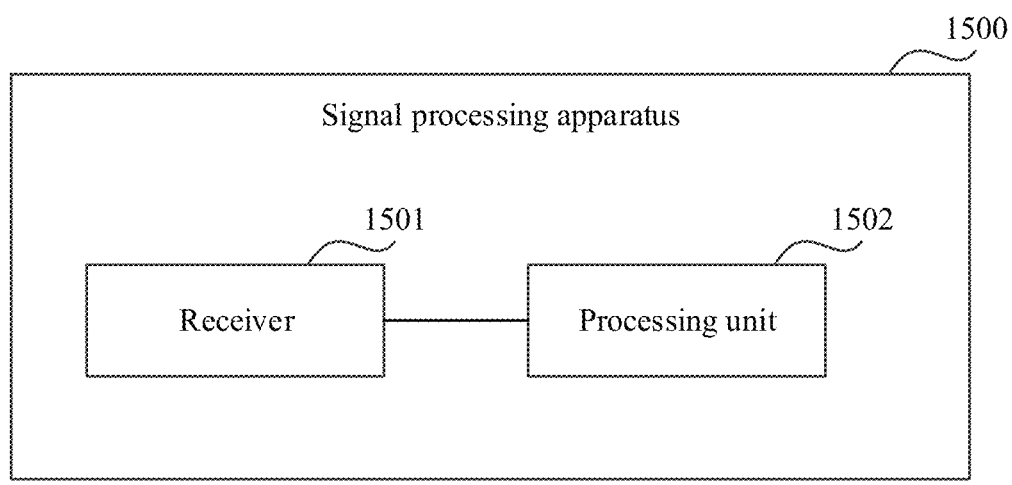
FIG. 15 is a schematic diagram of a structure of a signal processing apparatus according to an embodiment of this application.

An embodiment of this application provides a signal processing apparatus. The signal processing apparatus may be configured to perform the signal processing method shown in FIG. 9. Referring to FIG. 15, the signal transmission apparatus 1500 includes a receiver 1501 and a processing unit 1502.

The receiver 1501 is configured to receive a first echo signal and a second echo signal. The first echo signal is formed after a first burst in a measurement frame sent by a transmitter is reflected by one or more targets, the second echo signal is formed after a second burst in the measurement frame is reflected by the one or more targets, and the second burst is sent after the first burst. When the first burst is sent, each of the plurality of transmit antennas sends a chirp signal in a time division manner. When the second burst is sent, a quantity of transmit antennas configured to send a chirp signal is one.

The processing unit 1502 is configured to determine a velocity of the one or more targets based on echo signals received by the receiver 1501.

Optionally, when determining the velocity of the one or more targets based on echo signals received by the receiver 1501, the processing unit 1502 is configured to determine a first identifier based on the first echo signal, where the first identifier is used to indicate a distance measurement value and a velocity measurement value of the one or more targets; determine a second identifier based on the second echo signal, where the second identifier is used to indicate a distance measurement value and a velocity measurement value of the one or more targets; and determine the velocity of the one or more targets based on the first identifier and the second identifier.

Optionally, when determining the velocity of the one or more targets based on the first identifier and the second identifier, the processing unit 1502 is configured to determine, based on a transmission repetition period of a first transmit antenna in the first burst, an aliasing coefficient interval corresponding to the first identifier, determine an aliasing coefficient subset based on the first identifier, the second identifier, and the aliasing coefficient interval, determine a velocity aliasing coefficient based on the aliasing coefficient subset; and determine the velocity of the one or more targets based on the velocity aliasing coefficient and the first identifier.

Optionally, the receiver 1501 is further configured to: receive a third echo signal. The third echo signal is formed after a third burst in the measurement frame is reflected by the one or more targets, and the third burst is sent before the first burst. When determining the velocity of the one or more targets based on echo signals received by the receiver 1501, the processing unit 1502 is configured to if the one or more targets move away from the radar system, determine the velocity of the one or more targets based on the first echo signal and the third echo signal; and if the one or more targets move close to the radar system, determine the velocity of the one or more targets based on the first echo signal and the second echo signal.

Optionally, when determining the velocity aliasing coefficient based on the aliasing coefficient subset, the processing unit 1502 is configured to determine an observation result of a virtual MIMO subarray based on the echo signals received by the receiver 1501; and determine the velocity aliasing coefficient based on the observation result of the virtual MIMO subarray. The virtual MIMO subarray is a uniform planar subarray or a uniform linear subarray including virtual array elements in a virtual array, each transmit antenna corresponds to a same quantity of virtual array elements in the virtual MIMO subarray, and the virtual array includes a plurality of transmit antennas and a plurality of receive antennas included in the receiver 1501.

Optionally, when determining the velocity aliasing coefficient based on the aliasing coefficient subset, the processing unit 1502 is configured to determine an observation result of a virtual MIMO subarray based on the echo signals received by the receiver 1501, and determine the velocity aliasing coefficient based on the observation result of the virtual MIMO subarray. The virtual MIMO subarray is a uniform planar subarray or a uniform linear subarray including virtual array elements in a virtual array, the uniform planar subarray and the uniform linear subarray are obtained by linear interpolation, each transmit antenna corresponds to a same quantity of virtual array elements in the virtual MIMO subarray, and the virtual array includes a plurality of transmit antennas and a plurality of receive antennas included in the receiver 1501.

It should be noted that, the signal processing apparatus 1500 shown in FIG. 15 may be configured to perform the signal processing method shown in FIG. 9. For an implementation that is not described in detail in the signal processing apparatus 1500, refer to related descriptions in the signal processing method shown in FIG. 3.

Figure 16:
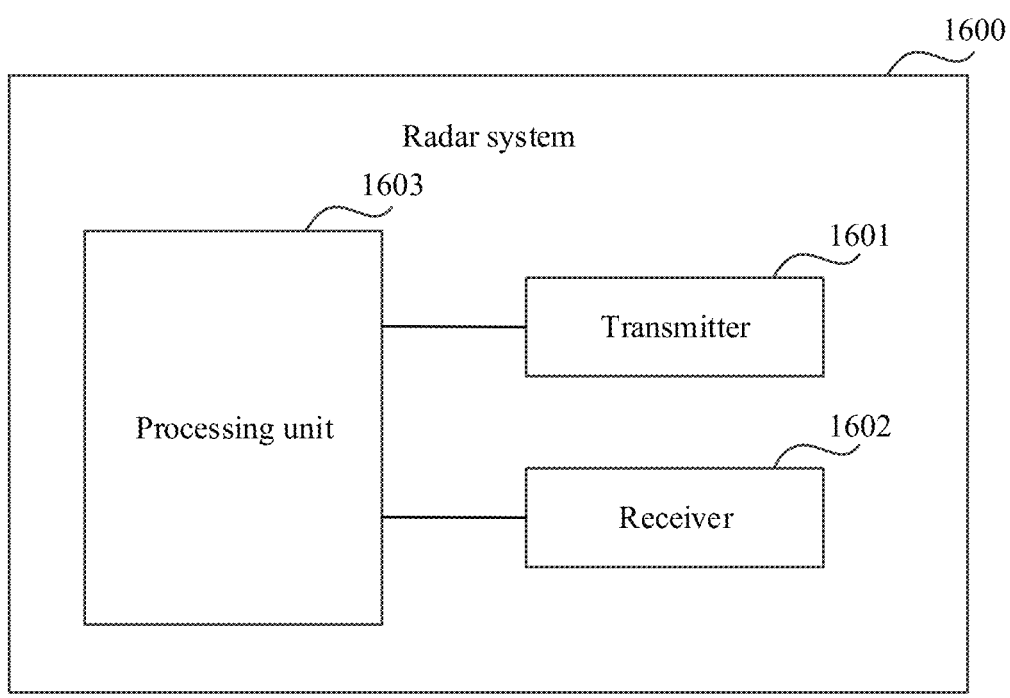
FIG. 16 is a schematic diagram of a structure of a radar system according to an embodiment of this application.

Based on a same concept, an embodiment of this application further provides a radar system. Referring to FIG. 16, the radar system 1600 includes a transmitter 1601, a receiver 1602, and a processing unit 1603.

The transmitter 1601 includes a plurality of transmit antennas, and the transmitter 1601 is configured to send a first burst in a measurement frame, where the measurement frame is used to measure a velocity of a target, and when the first burst is sent, each of the plurality of transmit antennas sends a chirp signal in a time division manner; and send a second burst in the measurement frame after sending the first burst in the measurement frame, where when the second burst is sent, a quantity of transmit antennas configured to send a chirp signal is one.

The receiver 1602 is configured to receive a first echo signal and a second echo signal. The first echo signal is formed after the first burst is reflected by one or more targets, the second echo signal is formed after the second burst is reflected by the one or more targets.

The processing unit 1603 is configured to determine a velocity of the one or more targets based on echo signals received by the receiver 1602.

Definitely, a person skilled in the art can make various modifications and variations to the embodiments of this application without departing from the scope of the embodiments of this application. In this way, this application is intended to cover these modifications and variations of the embodiments of this application provided that they fall within the scope of protection defined by the following claims and their equivalent technologies.

What is claimed is:

1. A method comprising:
   sending a first measurement frame at a duty cycle of P %, wherein P<100, wherein the duty cycle is equal to a ratio of a first duration of the first measurement frame to a second duration, and wherein the second duration is a time difference between two adjacent measurement frames received from a transmitter of a multiple-input multiple-output (MIMO) radar;
   sending a first burst in the first measurement frame for measuring a velocity of a target, wherein each of a plurality of transmit antennas of the transmitter sends a first chirp signal in the first burst in a time-division multiplexing (TDM) manner; and
   sending, in response to sending the first burst, a second burst in the first measurement frame, wherein a first quantity of the transmit antennas configured to send a second chirp signal in the second burst is one when the second burst is sent.

2. The method of claim 1, wherein before sending the first burst, the method further comprises sending a third burst in the first measurement frame, wherein a second quantity of the transmit antennas configured to send a third chirp signal in the third burst is one, and wherein a first transmit antenna configured to send the third burst and a second transmit antenna configured to send the second burst are the same transmit antenna.

3. The method of claim 2, further comprising:
   sending a fourth burst in a second measurement frame for measuring the velocity, wherein each of the transmit antennas sends a fourth chirp signal in the fourth burst in the TDM manner; and
   sending, in response to sending the fourth burst, a fifth burst in the second measurement frame, wherein a third quantity of the transmit antennas configured to send a fifth chirp signal in the fifth burst is one, and wherein transmission parameters of the fifth burst, the second burst, and the third burst are the same.

4. The method of claim 3, wherein the transmission parameters comprise a transmission slope, a transmit antenna, a quantity of chirp signals, or a duration of each chirp signal.

5. The method of claim 1, wherein the first measurement frame is a frequency modulated continuous wave (FMCW), a multiple frequency-shift keying (MFSK), or a phase modulated continuous wave (PMCW).

6. The method of claim 1, wherein in the first burst, quantities of chirp signals from the transmit antennas are different from each other.

7. The method of claim 1, further comprising sending, using an interface, a configuration of the first measurement frame to a monolithic microwave integrated circuit(MMIC) for enabling the transmitter to send the first measurement frame.

8. A method comprising:
   sending, by a transmitter of a multiple-input multiple-output (MIMO) radar, a first burst in a measurement frame, wherein each of a plurality of transmit antennas of the transmitter sends a first chirp signal in the first burst in a time-division multiplexing manner;
   sending, by the transmitter after the first burst, a second burst in the measurement frame, wherein a first quantity of transmit antennas configured to send a second chirp signal in the second burst is one when the second burst is sent;
   receiving, by a receiver of the MIMO radar, a first echo signal and a second echo signal, wherein the first echo signal is based on at least one reflection of the first burst by one or more targets, and wherin the second echo signal is based on at least one reflection of the second burst by the one or more targets;
   sending, by the transmitter before the first burst, a third burst in the measurement frame;
   receiving, by the receiver, a third echo signal based on at least one reflection of the third burst by the one or more targets; and
   determining that the one or more targets are moving away or towards a radar system,
   wherein a velocity of the one or more targets is based on the first echo signal and the third echo signal in response to determining that the one or more targets are moving away the radar system, and wherein the velocity of the one or more targets is based on the first echo signal and the second echo signal in response to determining that the one or more targets are moving towards the radar system.

9. An apparatus comprising:
a transmitter comprising a plurality of transmit antennas and configured to:
send a first measurement frame at a duty cycle of P %, wherein P<100, wherein the duty cycle is equal to a ratio of a first duration of the first measurement frame to a second duration, and wherein the second duration is a time difference between two adjacent measurement frames received from the transmitter;
send a first burst in the first measurement frame for measuring a velocity of a target, wherein each of the transmit antennas sends a first chirp signal in the first burst in a time-division multiplexing (TDM) manner; and
send, in response to sending the first burst, a second burst in the first measurement frame,
wherein a first quantity of transmit antennas configured to send a second chirp signal in the second burst is one when the second burst is sent.

10. The apparatus of claim 9, wherein the transmitter is further configured to send, before sending the first burst, a third burst in the first measurement frame, wherein a second quantity of transmit antennas configured to send a third chirp signal in the third burst is one, and wherein a first transmit antenna configured to send the third burst and a second transmit antenna configured to send the second burst are the same transmit antenna.

11. The apparatus of claim 10, wherein the transmitter is further configured to:
send, in response to sending the first measurement frame, a fourth burst in a second measurement frame for measuring the velocity of the target, wherein each of the transmit antennas sends a fourth chirp signal in the fourth burst in the TDM manner; and
send, in response to sending the fourth burst, a fifth burst in the second measurement frame, wherein a third quantity of transmit antennas configured to send a fifth chirp signal in the fifth burst is one, and wherein transmission parameters of the fifth burst, the second burst, and the third burst are the same.

12. The apparatus of claim 11, wherein the transmission parameters comprise a transmission slope, a transmit antenna, a quantity of chirp signals, or a duration of each chirp signal.

13. The apparatus of claim 9, wherein the first measurement frame is a frequency modulated continuous wave (FMCW), a multiple frequency-shift keying (MFSK), or a phase modulated continuous wave (PMCW).

14. The apparatus of claim 9, wherein in the first burst, quantities of chirp signals from the transmit antennas are different from each other.

15. The apparatus of claim 9, further comprising a processor configured to send, using an interface, a configuration of the first measurement frame to a monolithic microwave integrated circuit (MMIC) for enabling the transmitter to send the first measurement frame.

16. A radar system, comprising:
a transmitter comprising a plurality of transmit antennas and configured to:
send a first burst in a measurement frame for measuring a first velocity of a target, wherein each of the transmit antennas sends a first chirp signal in the first burst in a time-division multiplexing manner;
send, in response to sending the first burst, a second burst in the measurement frame, wherein a first quantity of transmit antennas configured to send a second chirp signal in the second burst is one when the second burst is sent;
a receiver configured to receive a first echo signal and a second echo signal, wherein the first echo signal is based on at least one reflection of the first burst by one or more targets,
wherein the second echo signal is based on at least one reflection of the second burst by the one or more targets,
wherein the transmitter is further configured to send, before sending the first burst, a third burst in the measurement frame, and wherein the receiver is further configured to receive a third echo signal based on at least one reflection of the third burst by the one or more targets; and
one or more processors configured to:
determine that the first velocity of the one or more targets is based on the first echo signal and the third echo signal when the one or more targets move away from a radar system; and
determine that the second velocity of the one or more targets is based on the first echo signal and the second echo signal when the one or more targets move towards the radar system.

17. The radar system of claim 16, wherein the measurement frame is a frequency modulated continuous wave (FMCW) or a multiple frequency key (MFSK).

18. The radar system of claim 16, wherein the measurement frame is a phase modulated continuous wave PMCW.

* * * * *